(12) United States Patent
Yamanoi et al.

(10) Patent No.: US 11,802,059 B2
(45) Date of Patent: *Oct. 31, 2023

(54) DECONTAMINANT, CARBON/POLYMER COMPOSITE, DECONTAMINATION SHEET MEMBER AND FILTER MEDIUM

(71) Applicant: Sony Corporation, Tokyo (JP)

(72) Inventors: Shun Yamanoi, Tokyo (JP); Hironori Iida, Tokyo (JP); Machiko Minatoya, Tokyo (JP); Seiichiro Tabata, Tokyo (JP); Shinichiro Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 9 days.

This patent is subject to a terminal disclaimer.

(21) Appl. No.: 16/910,899

(22) Filed: Jun. 24, 2020

(65) Prior Publication Data

US 2020/0317537 A1     Oct. 8, 2020

Related U.S. Application Data

(63) Continuation of application No. 13/982,810, filed as application No. PCT/JP2012/000854 on Feb. 9, 2012.

(30) Foreign Application Priority Data

Feb. 10, 2011  (JP) ................................. 2011-026858
Jan. 27, 2012  (JP) ................................. 2012-015058

(51) Int. Cl.
*C02F 1/28*  (2023.01)
*B01D 61/04*  (2006.01)
(Continued)

(52) U.S. Cl.
CPC ............. *C02F 1/288* (2013.01); *B01D 61/04* (2013.01); *B01D 61/08* (2013.01); *B01J 20/20* (2013.01);
(Continued)

(58) Field of Classification Search
CPC ........ B01D 2311/04; B01D 2311/2649; B01D 2313/90; B01D 61/04; B01D 61/08;
(Continued)

(56) References Cited

U.S. PATENT DOCUMENTS 4,954,469 A      9/1990  Robinson
2007/0221569 A1  9/2007  Stouffer et al.
(Continued)

FOREIGN PATENT DOCUMENTS

CN      2172279       7/1994
CN      101405224     4/2009
(Continued)

OTHER PUBLICATIONS

Office Action issued in connection with Chinese Patent Application Serial No. 201280007613.7, dated Aug. 26, 2014. (5 pages).
(Continued)

*Primary Examiner* — Dirk R Bass
(74) *Attorney, Agent, or Firm* — K&L Gates LLP

(57) ABSTRACT

A porous carbon material having a value of a specific surface area by a nitrogen BET method of $1\times10^2$ m$^2$/g or more, a volume of fine pores by a BJH method of 0.3 cm$^3$/g or more, and a particle size of 75 μm or more, alternatively, a porous carbon material having a value of a specific surface area by a nitrogen BET method of $1\times10^2$ m$^2$/g or more, a total of volumes of fine pores having a diameter of from $1\times10^{-9}$ m to $5\times10^{-7}$ m, obtained by a non-localized density functional theory method, of 1.0 cm$^3$/g or more, and a particle size of 75 μm or more.

30 Claims, 15 Drawing Sheets

(51) Int. Cl.
*B01D 61/08* (2006.01)
*B01J 20/28* (2006.01)
*B01J 20/20* (2006.01)
*C01B 32/05* (2017.01)
*C02F 1/00* (2023.01)
*C02F 1/42* (2023.01)
*C02F 101/20* (2006.01)
*C02F 101/30* (2006.01)
*C02F 1/44* (2023.01)
*C02F 1/68* (2023.01)
*C02F 101/36* (2006.01)
*C02F 101/12* (2006.01)

(52) U.S. Cl.
CPC ..... *B01J 20/2803* (2013.01); *B01J 20/28004* (2013.01); *B01J 20/28011* (2013.01); *B01J 20/28035* (2013.01); *B01J 20/28057* (2013.01); *B01J 20/28069* (2013.01); *B01J 20/28083* (2013.01); *C01B 32/05* (2017.08); *C02F 1/003* (2013.01); *C02F 1/281* (2013.01); *B01D 2311/04* (2013.01); *B01D 2313/90* (2013.01); *C01P 2004/60* (2013.01); *C01P 2006/12* (2013.01); *C02F 1/283* (2013.01); *C02F 1/285* (2013.01); *C02F 1/286* (2013.01); *C02F 1/42* (2013.01); *C02F 1/441* (2013.01); *C02F 1/444* (2013.01); *C02F 1/68* (2013.01); *C02F 2101/12* (2013.01); *C02F 2101/20* (2013.01); *C02F 2101/305* (2013.01); *C02F 2101/36* (2013.01); *C02F 2201/006* (2013.01); *C02F 2303/185* (2013.01); *C02F 2307/02* (2013.01); *C02F 2307/04* (2013.01); *C02F 2307/06* (2013.01); *C02F 2307/10* (2013.01)

(58) Field of Classification Search
CPC .. C01B 31/02; C01P 2004/60; C01P 2006/12; C02F 1/003; C02F 1/281; C02F 1/283; C02F 1/285; C02F 1/286; C02F 1/288; C02F 1/42; C02F 1/441; C02F 1/444; C02F 1/68; C02F 2101/12; C02F 2101/20; C02F 2101/305; C02F 2101/36; C02F 2201/006; C02F 2209/055; C02F 2303/185; C02F 2307/02; C02F 2307/04; C02F 2307/06; C02F 2307/10
USPC .............................................. 210/506, 510.1
See application file for complete search history.

(56) References Cited

U.S. PATENT DOCUMENTS

| | | | |
|---|---|---|---|
| 2009/0014366 | A1 | 1/2009 | Takeda et al. |
| 2009/0038632 | A1 | 2/2009 | Cashmore et al. |
| 2010/0069507 | A1 | 3/2010 | Tabata et al. |
| 2010/0219131 | A1 | 9/2010 | Levy |
| 2010/0291167 | A1 | 11/2010 | Iida et al. |

FOREIGN PATENT DOCUMENTS

| | | |
|---|---|---|
| CN | 101541676 | 9/2009 |
| EP | 2263484 A1 | 12/2010 |
| JP | H03-296486 | 12/1991 |
| JP | 05-049921 | 3/1993 |
| JP | 06-106161 | 4/1994 |
| JP | H08-019717 | 1/1996 |
| JP | 2000-313610 | 11/2000 |
| JP | 2001-205253 | 7/2001 |
| JP | 2005-001681 | 1/2005 |
| JP | 2005-060849 | 3/2005 |
| JP | 2005-131538 | 5/2005 |
| JP | 2008-533754 A | 8/2008 |
| JP | 2008-535754 A | 9/2008 |
| JP | 2008-273816 | 11/2008 |
| JP | 2009-072712 | 4/2009 |
| JP | 2009-173523 | 8/2009 |
| JP | 2010-509174 | 3/2010 |
| JP | 2010-100516 | 5/2010 |
| JP | 2010-104979 | 5/2010 |
| JP | 2011-225521 | 11/2011 |
| WO | 2006/025198 | 3/2006 |
| WO | 2007/094364 | 8/2007 |

OTHER PUBLICATIONS

Office Action issued in connection with Chinese Patent Application Serial No. 201280007613.7, dated Apr. 2015. (6 pages).
Office Action issued in CN Application 201280007613.7, dated Oct. 8, 2015 (6 pages).
Office Action issued in JP Application 2012015058, dated Sep. 8, 2015 (3 pages).
Office Action issued in JP Application 2012015058, dated Apr. 5, 2016 (3 pages).
Japanese Office Action dated Jul. 26, 2016 in corresponding Japanese application No. 2012-015058 (2 pages).
Extended European Search Report dated Nov. 16, 2016 in corresponding European Application No. 12745220.9 (13 pages).
Japanese Office Action dated Mar. 7, 2017 in corresponding Japanese application No. 2016-122715 (10 pages).
Japan Patent Office, Office Action for Japanese Application No. 2012-015058, dated Jun. 6, 2017 (7 pages).
Office Action dated Sep. 12, 2017 in corresponding Japanese application No. 2016-122715 (4 pages).
Office Action dated Jan. 17, 2018 in corresponding Chinese Patent Application No. 201610375193.8 (6 pages).
Office Action dated Jan. 17, 2018 in corresponding Chinese Patent Application No. 201610374300.5 (7 pages).
Notice of reasons for refusal dated Mar. 13, 2018 in corresponding Japanese Patent Application No. 2016-122715 (4 pages).
Japanese Office Action dated Mar. 27, 2018 in corresponding Japanese Application No. 2017-141885.
Japanese Office Action dated Jul. 10, 2018 in corresponding Japanese Application No. 2017-141885.
Ewansiha, et al., Proximate and mineral composition of coconut (*Cocos nucifera*) shell, Int. J. Pure Appl. Sci. Technol., 13(1) (2012), pp. 57-60.
Child, et al., Composition of Coconut Shells, Coconut Research Scheme of Ceylong, Jun. 1938, vol. 60, 1506-1507.
Office Action dated Feb. 8, 2019 in corresponding European Application No. 12 745 220.9.
Japanese Office Action dated Aug. 27, 2019 in corresponding Japanese Application No. 2018-170288.
Application Technology of Activated Carbon: Its Maintenance Management and Existing Problems,Jul. 31, 2002,Benyingji Li, et al.,p. 428, as referenced in Chinese Office Action dated Jul. 1, 2021 for corresponding Chinese Application No. 2019101897797.7.
Water Sciences and Water Resources, Jun. 30, 1998,Yuanzhen Guo, Hunan Science and Technology Press,p. 30-31, as referenced in Chinese Office Action dated Jul. 1, 2021 for corresponding Chinese Application No. 2019101897797.7.

(A)

(B)

Sodium dodecylbenzene sulfonate (A) [40 mL/min]

(B) [240 mL/min]

Chlorothalonil (A) [40 mL/min]

(B) [240 mL/min]

Dichlorvos

[40 mL/min]

Soluble lead

[40 mL/min]

Free chlorine (A) [40 mL/min]

(B) [240 mL/min]

(A)

(B)

DECONTAMINANT, CARBON/POLYMER COMPOSITE, DECONTAMINATION SHEET MEMBER AND FILTER MEDIUM

CROSS-REFERENCE TO RELATED APPLICATIONS

The present application is a continuation of U.S. application Ser. No. 13/982,810, filed Jul. 31, 2013, which is a national stage of International Application No. PCT/JP2012/000854 filed on Feb. 9, 2012 and claims priority to Japanese Patent Application No. 2011-026858 filed on Feb. 10, 2011, and Japanese Patent Application No. 2012-015058 filed on Jan. 27, 2012, the disclosure of which is incorporated herein by reference.

TECHNICAL FIELD

The present invention relates to a decontaminant, a carbon/polymer composite, a decontamination sheet member and a filter medium.

BACKGROUND ART

A water cleaner for purifying water frequently uses an activated carbon as was disclosed in Japanese Unexamined Patent Application Publication No. 2001-205253 and Japanese Unexamined Patent Application Publication No. Hei 06-106161, for example. Further, a water cleaner is frequently attached directly to, for example, a water outlet and used.

CITATION LIST

Patent Document 1: Japanese Unexamined Patent Application Publication No. 2001-205253
Patent Document 2: Japanese Unexamined Patent Application Publication No. Hei 06-106161

SUMMARY OF INVENTION

Problem to be Solved by the Invention

In such a conventional water cleaner, there is a problem that when a filtration flow rate is large, that is, when a flow rate of water flowing through a water cleaner is large, in some cases, a water purifying function can not be fully exerted. Further, in order to increase a specific surface area, a powdered activated carbon is frequently used. In this case, there may be a problem that a powdered activated carbon leaks out of a water cleaner together with purified water. Further, there is a strong demand for a decontaminant, a carbon/polymer composite, and a decontamination sheet member, which can more effectively remove a contaminant. Still further, there is also a demand for controlling the water hardness by flowing through a filter medium. However, as far as the inventors have investigated, a technology that can achieve such a demand has not been known.

Therefore, a first object of the present invention is to provide a decontaminant, a carbon/polymer composite, a decontamination sheet member, and a filter medium, which can more effectively remove a contaminant. Further, a second object of the present invention is to provide a filter medium that can sufficiently exert a cleaning function even when a filtration flow rate is large, and, is difficult to cause such a problem as that it flows off together with a cleaned fluid. Still further, a third object of the present invention is to provide a filter medium that can control the water hardness.

Means for Solving the Problem

A decontaminant according to a first embodiment of the present invention for achieving the first object includes a porous carbon material having a value of a specific surface area based on a nitrogen BET method of $1\times10^2$ m$^2$/g or more, a volume of fine pores based on a BJH method of 0.3 cm$^3$/g or more, desirably 0.4 cm$^3$/g or more, and more desirably 0.5 cm$^3$/g or more, and a particle size of 75 μm or more. For convenience, in some cases, such a porous carbon material is referred to as a "porous carbon material according to the first embodiment of the present invention". Here, also a porous carbon material having a particle size of 75 μm or more which was obtained by granulating porous carbon material having a particle size of less than 75 μm, or also a porous carbon material having a particle size of 75 μm or more which was obtained by granulating a porous carbon material where a porous carbon material having a particle size of less than 75 μm and a porous carbon material having a particle size of 75 μm or more are mixed is included in a "porous carbon material having a particle size of 75 μm or more" of the present invention. The same is also in the description below.

A decontaminant according to a second embodiment of the present invention for achieving the first object includes a porous carbon material having a value of a specific surface area based on a nitrogen BET method of $1\times10^2$ m$^2$/g or more, a total of volumes of fine pores having a diameter of from $1\times10^{-9}$ m to $5\times10^{-7}$ m, obtained by a non-localized density functional theory method, of 1.0 cm$^3$/g or more, and a particle size of 75 μm or more. For convenience, in some cases, such a porous carbon material is referred to as a "porous carbon material according to the second embodiment of the present invention".

A decontaminant according to a third embodiment of the present invention for achieving the first object includes a porous carbon material having a value of a specific surface area based on a nitrogen BET method of $1\times10^2$ m$^2$/g or more, having at least one peak in the range of 3 nm to 20 nm, in a pore diameter distribution obtained by a non-localized density functional theory method, in which a ratio of a total of volumes of fine pores which have pore diameters in the range of 3 nm to 20 nm, with respect to a sum total of volumes of all fine pores, is 0.2 or more, and having a particle size of 75 μm or more. For convenience, in some cases, such a porous carbon material is referred to as a "porous carbon material according to the third embodiment of the present invention".

A decontaminant according to a fourth embodiment of the present invention for achieving the first object includes a porous carbon material having a value of a specific surface area based on a nitrogen BET method of $1\times10^2$ m$^2$/g or more, a volume of fine pores by mercury porosimetry of 1.0 cm$^3$/g or more, and a particle size of 75 μm or more. For convenience, in some cases, such a porous carbon material is referred to as a "porous carbon material according to the fourth embodiment of the present invention".

A carbon/polymer composite according to the first embodiment of the present invention for achieving the first object includes the porous carbon material according to the first embodiment of the present invention, and a binder.

A carbon/polymer composite according to the second embodiment of the present invention for achieving the first object includes the porous carbon material according to the second embodiment of the present invention, and a binder.

A carbon/polymer composite according to the third embodiment of the present invention for achieving the first object includes the porous carbon material according to the third embodiment of the present invention, and a binder.

A carbon/polymer composite according to the fourth embodiment of the present invention for achieving the first object includes the porous carbon material according to the fourth embodiment of the present invention, and a binder.

A decontamination sheet member according to the first embodiment of the present invention for achieving the first object includes the porous carbon material according to the first embodiment of the present invention, and a support member.

A decontamination sheet member according to the second embodiment of the present invention for achieving the first object includes the porous carbon material according to the second embodiment of the present invention, and a support member.

A decontamination sheet member according to the third embodiment of the present invention for achieving the first object includes the porous carbon material according to the third embodiment of the present invention, and a support member.

A decontamination sheet member according to the fourth embodiment of the present invention for achieving the first object includes the porous carbon material according to the fourth embodiment of the present invention, and a support member.

A filter medium according to the first embodiment of the present invention for achieving the second object includes the porous carbon material according to the first embodiment of the present invention.

A filter medium according to the second embodiment of the present invention for achieving the second object includes the porous carbon material according to the second embodiment of the present invention.

A filter medium according to the third embodiment of the present invention for achieving the second object includes the porous carbon material according to the third embodiment of the present invention.

A filter medium according to the fourth embodiment of the present invention for achieving the second object includes the porous carbon material according to the fourth embodiment of the present invention.

A filter medium according to a fifth embodiment of the present invention for achieving the third object includes a porous carbon material having a value of a specific surface area based on a nitrogen BET method of $1 \times 10^2$ m$^2$/g or more, a volume of fine pores based on a BJH method of 0.1 cm$^3$/g or more, and having a plant containing at least one component selected from the group consisting of sodium, magnesium, potassium and calcium as a raw material.

A filter medium according to a sixth embodiment of the present invention for achieving the third object includes a porous carbon material having a value of a specific surface area based on a nitrogen BET method of $1 \times 10^2$ m$^2$/g or more, a total of volumes of fine pores having a diameter of $1 \times 10^{-9}$ m to $5 \times 10^{-7}$ m obtained by a non-localized density functional theory method of 0.1 cm$^3$/g or more, desirably 0.2 cm$^3$/g or more, and having a plant containing at least one component selected from the group consisting of sodium, magnesium, potassium and calcium as a raw material.

A filter medium according to a seventh embodiment of the present invention for achieving the third object includes a porous carbon material having a value of a specific surface area based on a nitrogen BET method of $1 \times 10^2$ m$^2$/g or more, having at least one peak in the range of 3 nm to 20 nm, in a pore diameter distribution obtained by a non-localized density functional theory method, in which a ratio of a total of volumes of fine pores which have pore diameters in the range of 3 nm to 20 nm, with respect to a sum total of volumes of all fine pores, is 0.1 or more, and having a plant containing at least one component selected from the group consisting of sodium, magnesium, potassium and calcium as a raw material.

A filter medium according to an eighth embodiment of the present invention for achieving the third object includes a porous carbon material having a value of a specific surface area based on a nitrogen BET method of $1 \times 10^2$ m$^2$/g or more, a volume of fine pores by mercury porosimetry of 1.0 cm$^3$/g or more, and having a plant containing at least one component selected from the group consisting of sodium, magnesium, potassium and calcium as a raw material.

A filter medium according to each of ninth to fifteenth embodiments of the present invention for achieving the first object includes a porous carbon material according to the first embodiment of the present invention, or, a porous carbon material according to the second embodiment of the present invention, or, a porous carbon material according to the third embodiment of the present invention, or, a porous carbon material according to the fourth embodiment of the present invention.

Further, in a filter medium according to a ninth embodiment of the present invention, when water containing 1 μg/L of a substance having a molecular weight of $1 \times 10^2$ to $1 \times 10^5$ is continuously flowed at a spatial velocity of 1200 hr$^{-1}$ for 48 hours, the time taken until a removal rate of the substance reaches 80% is twice or more longer than the time taken until the removal rate of the substance reaches 80% when a coconut shell activated carbon is used. Here, as a coconut shell activated carbon, Kuraray Coal GW manufactured by Kuraray Chemical Co., Ltd. is used.

Further, a filter medium according to a tenth embodiment of the present invention has a removal rate of dodecylbenzene sulfonate of 10% or more when water containing 0.9 mg/L of dodecylbenzene sulfonate is continuously flowed at a spatial velocity of 1200 hr$^{-1}$ for 25 hours.

Still further, a filter medium according to an eleventh embodiment of the present invention has a removal rate of chlorothalonil of 60% or more when water containing 6 μg/L of chlorothalonil is continuously flowed at a spatial velocity of 1200 hr$^{-1}$ for 50 hours.

Further, a filter medium according to a twelfth embodiment of the present invention has a removal rate of dichlorvos of 60% or more when water containing 6 μg/L of dichlorvos is continuously flowed at a spatial velocity of 1200 hr$^{-1}$ for 25 hours.

Still further, a filter medium according to a thirteenth embodiment of the present invention has a removal rate of soluble lead of 30% or more when water containing 6 μg/L of soluble lead is continuously flowed at a spatial velocity of 1200 hr$^{-1}$ for 25 hours.

Further, a filter medium according to a fourteenth embodiment of the present invention has a removal rate of free chlorine of 70% or more when water containing 0.2 mg/L of free chlorine is continuously flowed at a spatial velocity of 1200 hr$^{-1}$ for 50 hours.

Still further, a filter medium according to a fifteenth embodiment of the present invention has a removal rate of total organic halogens of 45% or more when water containing 130 µg/L of total organic halogens in terms of chlorine is continuously flowed at a spatial velocity of 1200 hr$^{-1}$ for 5 hours.

Effect of the Invention

In the decontaminants according to first to fourth embodiments of the present invention, carbon/polymer composites according to first to fourth embodiments of the present invention, decontamination sheet members according to first to fourth embodiments of the present invention, or filter media according to first to fourth embodiments and ninth to fifteenth embodiments of the present invention, since a value of a specific surface area, a value of volumes of various kinds of fine pores and a pore distribution of a porous carbon material used are specified, a contaminant can be removed at a high efficiency, a fluid can be cleansed at a high filtration flow rate, and a desired substance can be removed at a high efficiency. Further, since a particle size of a porous carbon material is specified, it is difficult for a porous carbon material to flow out together with a fluid. In the decontaminants according to first to fourth embodiments of the present invention, carbon/polymer composites according to first to fourth embodiments of the present invention, decontamination sheet members according to first to fourth embodiments of the present invention, or filter media according to first to fourth embodiments of the present invention, in addition to adsorption of contaminants, for example, on the basis of a chemical reaction such as HClO+C (porous carbon material)→CO (surface of porous carbon material)+H$^+$+Cl$^-$, the chlorine component can be removed. Further, in the filter media according to fifth to eighth embodiments of the present invention, since a value of a specific surface area, a value of volumes of fine pores, and a pore distribution of a porous carbon material used are specified, and a raw material is specified, hardness of the water that has passed through the filter medium can be controlled.

MODES FOR CARRYING OUT THE INVENTION

Figure 1:
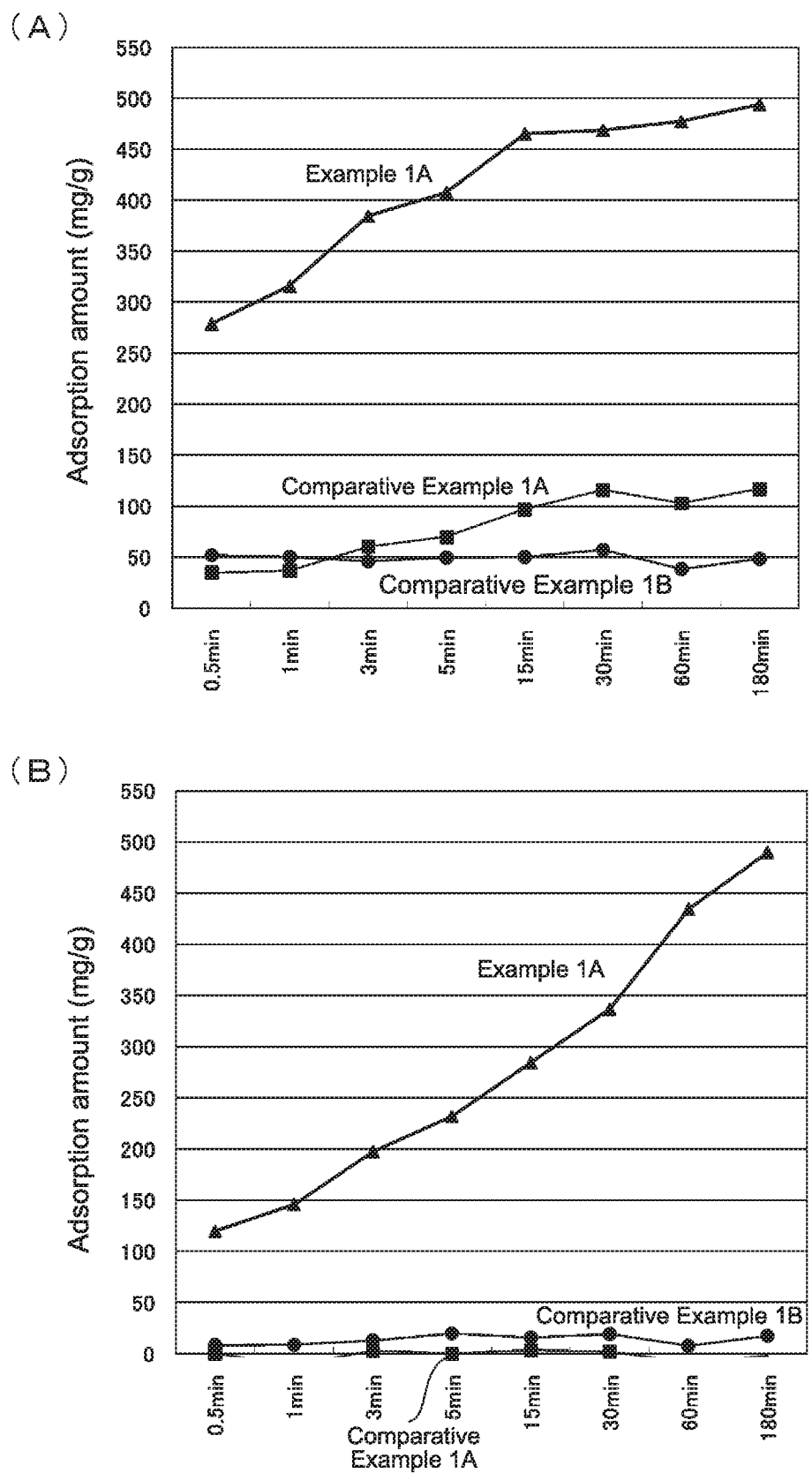
FIGS. 1 (A) and (B) of FIG. 1 are graphs each showing a relationship between a test time of filter media of Example 1A and Comparative Example 1A and Comparative Example 1B and an adsorption amount of each of Methylene blue and Black 5 per 1 g of a filter medium.

Hereinafter, with reference to drawings, the present invention will be described based on Examples. However, the present invention is not limited to the Examples. Various kinds of numerical values and materials in the Examples are illustrations. Description will be carried out in the following order.

1. Descriptions overall, of decontaminants according to first to fourth embodiments of the present invention, carbon/polymer composites according to first to fourth embodiments of the present invention, decontamination sheet members according to first to fourth embodiments of the present invention, and filter media according to first to fifteenth embodiments of the present invention.

2. Example 1 (decontaminants according to first to fourth embodiments of the present invention, carbon/polymer composites according to first to fourth embodiments of the present invention, decontamination sheet members according to first to fourth embodiments of the present invention, and filter media according to first to fourth embodiments of the present invention).

3. Example 2 (modification of Example 1).
4. Example 3 (another modification of Example 1).
5. Example 4 (still another modification of Example 1).
6. Example 5 (still another modification of Example 1).
7. Example 6 (filter media according to fifth to eighth embodiments of the present invention).
8. Example 7 (filter media according to ninth to fifteenth embodiments of the present invention).
9. Example 8 (modifications of Examples 1 to 7), and others.

[Descriptions Overall, of Decontaminants According to First to Fourth Embodiments of the Present Invention, Carbon/Polymer Composites According to First to Fourth Embodiments of the Present Invention, Decontamination Sheet Members According to First to Fourth Embodiments of the Present Invention, and Filter Media According to First to Fifteenth Embodiments of the Present Invention]

In the following descriptions, in some cases, decontaminants according to first to fourth embodiments of the present invention are generically called simply as "decontaminant of the present invention", carbon/polymer composites according to first to fourth embodiments of the present invention are generically called simply as "carbon/polymer composite of the present invention", decontamination sheet members according to first to fourth embodiments of the present invention are generically called simply as "decontamination sheet member of the present invention, and filter media according to first to fifteenth embodiments of the present invention are generically called simply as "filter medium of the present invention". Further, in some cases, decontaminants of the present invention, carbon/polymer composite of the present invention, decontamination sheet members of the present invention and filter media of the present invention are generically called simply as "present invention", and porous carbon materials making up the decontaminants of the present invention, carbon/polymer composites of the present invention, decontamination sheet members of the present invention, and filter media according to first to fourth embodiments and ninth to fifteenth embodiments are generically called as "porous carbon materials in the present invention".

Porous carbon materials which make up the decontaminants according to a first embodiment of the present invention, carbon/polymer composites according to the first embodiment of the present invention, decontamination sheet members according to the first embodiment of the present invention or filter media according to the first embodiment of the present invention desirably have a volume of fine pores by mercury porosimetry of 1.5 $cm^3/g$ or more, but are not limited thereto. Further, a volume of fine pores by an MP method is desirably 0.1 $cm^3/g$ or more.

In porous carbon materials which make up the decontaminants according to first to fourth embodiments of the present invention, or the filter media according to first to fourth embodiments and ninth to fifteenth embodiments of the present invention, which include the above-described desirable modes, a bulk density of the porous carbon material is desirably 0.1 $g/cm^3$ to 0.8 $g/cm^3$, but is not limited thereto. When the bulk density of the porous carbon material is specified as in the above range, there is no fear that the porous carbon material disturbs a flow of a fluid. That is, the pressure loss of a fluid, which is caused by the porous carbon material, can be suppressed.

In filter media according to fifth to eighth embodiments of the present invention, which include the desirable modes described above, a porous carbon material has a plant containing at least one component selected from the group consisting of sodium (Na), magnesium (Mg), potassium (K) and calcium (Ca) as a raw material, as was described above. When a filter medium obtained from such a plant raw material is used, since mineral components are abundantly eluted from the porous carbon material into filtrate water, hardness of filtrate water can be controlled as a result. In this case, in some possible modes, at 6 hours after 1 g of a filter medium was added to 50 mL of water (water for test) having the hardness of 0.1 or less, the hardness becomes 5 or more. The porous carbon material desirably contains 0.4% by mass or more in total of sodium (Na), magnesium (Mg), potassium (K) and calcium (Ca). Here, specifically, as a plant raw material, skin of citrus fruits such as mandarin orange skin, orange skin, and grape fruit skin, and skin of banana can be mentioned.

Further, from such porous carbon materials which make up the filter media according to the fifth to eighth embodiments of the present invention, various kinds of functional foods including functional foods as a mineral supplement for supplementing minerals, cosmetics including cosmetics as a mineral supplement for supplementing minerals, and cosmetic materials can be formed. In the functional foods, in addition to the above, for example, an excipient, a binder, a disintegrating agent, a lubricant, a diluent, a flavoring substance, a preserving agent, a stabilizer, a colorant, a perfume, vitamins, a color former, a gloss agent, a sweetener, a bittering agent, an acidulant, a flavor enhancer, a fermented seasoning, an antioxidant, a yeast, a yeast extract, and an enrichment may be contained. As a form of the functional foods, a powdery shape, a solid-like shape, a tablet-like shape, a particulate shape, a granular shape, a capsular shape, a creamy shape, a sol-like shape, a gel-like shape and a colloidal shape can be mentioned. Examples of cosmetics include a lotion or a pack impregnated with lotion, a cleansing agent that removes stain components such as sweat, oil and fat, and a lipstick; and as other components in cosmetic materials, a substance that contains a hydrophobic beauty component (for example, daidzein, genistein) can be mentioned, and as a component having moisturizing effect and/or anti-oxidation effect, effective ingredients contained in lotions such as hyaluronic acid, astaxanthin, tocopherol, trolox and coenzyme Q10 can be mentioned.

The porous carbon material in the present invention is specified to have a particle size of 75 μm or more. Such a specification is based on JIS Z8801-1: 2006 "Test sieves—Part 1: Test sieves of metal wire". That is, when a test is conducted by using a metal mesh having a nominal opening of 75 μm (so-called metal mesh of 200 mesh) and a porous carbon material that does not pass the metal mesh is 90% by mass or more, a particle size is defined to be 75 μm or more. Further, in the following description, such a porous carbon material is called as "200 mesh on product" and a porous carbon material that passed the metal mesh of 200 mesh is called as "200 mesh pass product". When a particle size is measured, the measurement is conducted in a state where the porous carbon material in the present invention is used, that is, in a state including primary particles and secondary particles generated by flocculation of a plurality of primary particles.

Further, a measurement of fine pores by mercury porosimetry is conducted in accordance with JIS R1655: 2003 "Test methods for pore size distribution of fine ceramic green body by mercury porosimetry". Specifically, by using a mercury porosimeter (trade name: PASCAL440, manufactured by Thermo Electron Corporation), mercury porosimetry was conducted. A fine pore measurement region was set to 15 μm to 2 nm.

The decontaminant of the present invention can be used for cleaning, for example, water or air, broadly, for cleaning a fluid. Alternatively, the decontaminant of the present invention can be used as a remover for removing, for example, a harmful material or a waste material. The decontaminant of the present invention can be used in a form of a sheet, in a state filled in a column or a cartridge, in a state housed in a water-permeating bag, in a state formed into a desired shape with a binder, or in a state of powder, for example. In the case where the decontaminant is used being dispersed in a solution, a surface thereof can be subjected to hydrophilic or hydrophobic treatment, to be used. From the carbon/polymer composite or the decontamination sheet member of the present invention, for example, a filter for an air purifier, a mask, a protective glove and protective shoes can be formed.

In the decontamination sheet members of the present invention including the desirable modes described above, a woven fabric or a nonwoven fabric can be mentioned as a support member, and as a material forming the support member, cellulose, polypropylene and polyester can be mentioned. As a form of the decontamination sheet member, a form in which the porous carbon material of the present invention is sandwiched between one support member and another support member, and a form in which the porous carbon material is blended in a support member can be mentioned. Alternatively, as a form of the decontamination sheet member, a form in which the carbon/polymer composite of the present invention is sandwiched between one support member and another support member and a form in which the carbon/polymer composite is blended in a support member can be mentioned. As a binder which make up the carbon/polymer composite, for example, carboxynitrocellulose can be mentioned.

A purification apparatus suitable for incorporating the filter medium of the present invention including the above-described desirable modes, specifically, a water cleaner (hereinafter, in some cases, referred to as "water cleaner in the present invention") may have a structure (combined use of the filter medium of the present invention and a filtration membrane) that further includes a filtration membrane (for example, hollow fiber membrane or flat membrane having 0.4 μm to 0.01 μm holes), a structure (combined use of the filter medium of the present invention and a reverse osmosis membrane) that further includes a reverse osmosis membrane (RO), a structure (combined use of the filter medium of the present invention and a ceramic filter medium) that further includes a ceramic filter medium (ceramic filter medium having fine pores), or a structure (combined use of the filter medium of the present invention and an ion exchange resin) that further includes an ion exchange resin. In general, filtrate water passed through a reverse osmosis membrane (RO) would hardly contain a mineral component. However, by passing through a reverse osmosis membrane (RO) and then passing through a filter medium of the present invention, a mineral component can be imparted to the filtrate water.

As types of the water cleaners of the present invention, a continuous water cleaner, a batch water cleaner and a reverse osmosis membrane water cleaner can be mentioned, or a faucet-coupled water cleaner in which a water cleaner body is directly attached to an tip part of a water faucet, a stationary water cleaner (also referred to as top sink water cleaner or table top water cleaner), a water faucet-integrated water cleaner in which a water cleaner is incorporated in a water faucet, a under-sink water cleaner that is installed in a sink of a kitchen (built-in water cleaner), a pot water cleaner in which a water cleaner is incorporated in a container such as a pot and a pitcher (pitcher water cleaner), a central water cleaner that is directly attached to a water pipe after a water meter, a portable water cleaner and a straw water cleaner can be mentioned. The water cleaner in the present invention can have a constitution and structure the same as those of a water cleaner of the past. In the water cleaner in the present invention, a filter medium (porous carbon material) of the present invention can be used in a cartridge, for example, and to the cartridge, a water inlet and a water outlet may be provided. The "water" that is a target of purification in the water cleaner in the present invention is not limited to the "water" defined in "3. Terms and Definitions" of JIS S3201: 2010 "Testing methods for household water cleaners".

Alternatively, as a member suitable for incorporating the filter medium of the present invention, a cap or a cover in a bottle (so-called PET bottle), a laminate container, a plastic container, a glass container, a glass bottle, and the like, which are provided with a cap, a cover, a straw member, or a spray member can be mentioned. Here, when a filter medium of the present invention is disposed inside a cap or a cover, and a liquid or water (drinkable water, a lotion, or the like) in a bottle, a laminate container, a plastic container, a glass container, a glass bottle or the like is passed through the filter medium of the present invention disposed inside the cap or cover and is drunk, or used, a mineral ingredient can be contained in filtrate water. Alternatively, a form in which the filter medium of the present invention is housed in a bag having water permeability, and the bag is put in a liquid or water (drinkable water, a lotion, or the like) inside various kinds of containers such as a bottle (so-called PET bottle), a laminate container, a plastic container, a glass container, a glass bottle, a pot and a pitcher, can be adopted.

In the case where a raw material of a porous carbon material in the present invention is a plant-derived material containing silicon (Si), specifically, a content of a residue on ignition (ash residue) in a porous carbon material is desirably 15% by mass or less, but is not limited thereto. Further, a content of a residue on ignition (ash residue) in a porous carbon material precursor or a carbonaceous substance, which will be described below, is desirably 20% by mass or more. Here, a residue on ignition (ash residue) indicates a percentage by mass of a substance remained when a specimen dried at 120° C. for 12 hours is heated up to 800° C. in air (dry air), and, specifically, can be measured based on a thermogravimetric (TG) method.

Porous carbon materials in the present invention or porous carbon materials which make up filter media according to the fifth to eighth embodiments of the present invention can be obtained, for example, in such a manner that after a plant-derived material is carbonized at 400° C. to 1400° C., the carbonized material is treated with an acid or an alkali. In such a method for manufacturing a porous carbon material (hereinafter, in some cases, simply referred to as "method for manufacturing a porous carbon material"), a material that is obtained by carbonizing the plant-derived material at 400° C. to 1400° C. and before an acid or alkali treatment is applied is called as a "porous carbon material precursor" or a "carbonaceous substance".

In the method for manufacturing a porous carbon material, after an acid or alkali treatment, a step of conducting an activation treatment may be included, and, after the activation treatment, an acid or alkali treatment may be conducted. Further, in the method for manufacturing a porous carbon material including such a desirable form, although depending on the plant-derived material being used, before carbonizing the plant-derived material, at a temperature (for example, 400° C. to 700° C.) lower than a temperature for carbonizing, the plant-derived material may be preheated (pre-carbonizing treatment) in a state where oxygen is shut off. Thereby, since a tar component that would be generated in the course of carbonization can be extracted, the tar component that would be generated in the course of carbonization can be reduced or removed. A state where oxygen is shut off can be achieved by using, for example, an inert gas atmosphere such as nitrogen gas and argon gas, or a vacuum atmosphere, or a kind of smothering state of the plant-derived material. Further, in the method for manufacturing a porous carbon material, though depending on the plant-derived material, in some cases, in order to reduce mineral components or moisture contained in the plant-derived material, or, in order to prevent an unusual odor from occurring in the course of carbonization, the plant-derived material may be dipped in an acid or alkali, or in alcohol (for example, methyl alcohol, ethyl alcohol, or isopropyl alcohol). In the method for manufacturing a porous carbon material, after that, a pre-carbonizing treatment may be conducted. Examples of materials that are desirable to be heated in an inert gas atmosphere include plants that abundantly generate pyroligneous acid (tar and light oil). Further, examples of materials that are desirable to be treated with alcohol include seaweeds that abundantly contain iodine or various kinds of minerals.

According to the method for manufacturing a porous carbon material, the plant-derived material is carbonized at 400° C. to 1400° C. Here, the carbonization generally means to heat an organic substance (porous carbon material in the present invention, or a plant-derived material in a porous carbon material that makes up filter media according to the fifth embodiment to eighth embodiment of the present invention) to convert to a carbonaceous substance (for example, see JIS M0104-1984). As an atmosphere for carbonization, an atmosphere where oxygen is shut off can be mentioned, and, specifically, a vacuum atmosphere, an inert gas atmosphere such as nitrogen gas and argon gas, and an atmosphere where a material of plant origin is put into a kind of smothering state can be mentioned. An example of a rate of temperature increase until reaching the carbonization temperature, under such an atmosphere, may be 1° C./min or more, desirably 3° C./min or more, and more desirably 5° C./min or more, but is not limited thereto. Further, an example of the upper limit of a carbonization time may be 10 hours, desirably 7 hours, and more desirably 5 hours, without particularly limiting thereto. The lower limit of a carbonization time can be set to a time where the plant-derived material is surely carbonized. Further, the plant-derived material may be pulverized to a desired particle size, and may be classified, as desired. The plant-derived material may be pre-washed. Alternatively, the obtained porous carbon material precursor or porous carbon material may be pulverized to a desired particle size, and may be classified, as desired. Or, the porous carbon material after the activation treatment may be pulverized to a desired particle size, and may be classified, as desired. Further, the finally obtained porous carbon material may be subjected to sterilization treatment. Without particularly limiting a type, a formation, and a structure of a furnace used for carbonization, either a continuous furnace or a batch furnace can be used.

In the method for manufacturing a porous carbon material, as was described above, when an activation treatment is conducted, the number of micro pores (described below) having a pore diameter smaller than 2 nm can be increased. As a method of the activation treatment, a gas activation method and a chemical activation method can be mentioned. Here, the gas activation method is a method by using oxygen, water vapor, carbon dioxide, air or the like as an activator, and by heating a porous carbon material under such an atmosphere, at 700° C. to 1400° C., desirably at 700° C. to 1000° C., and more desirably at 800° C. to 950° C., for several tens of minutes to several hours, so that a fine structure is developed due to volatile components or carbon molecules in the porous carbon material. More specifically, a heating temperature may be appropriately selected based on a type of the plant-derived material, a type and a concentration of gas, and the like. A chemical activation method is a method in which in place of oxygen or water vapor used in the gas activation method, zinc chloride, iron chloride, calcium phosphate, calcium hydroxide, magnesium carbonate, potassium carbonate, sulfuric acid or the like is used to activate, the resultant is washed with hydrochloric acid, pH of which is adjusted with an alkaline aqueous solution, and the resultant is dried.

On a surface of a porous carbon material in the present invention, or, on a surface of a porous carbon material that makes up a filter medium according to the fifth to eighth embodiments of the present invention, a chemical treatment or a molecular modification may be applied. As a chemical treatment, for example, a treatment in which carboxyl groups are generated on the surface by a nitric acid treatment can be mentioned. Further, by conducting a treatment the same as the activation treatment with water vapor, oxygen, alkali, or the like on the surface of the porous carbon material, various kinds of functional groups such as a hydroxyl group, a carboxyl group, a ketone group and an ester group can be generated. Further, by reacting with a chemical species or a protein having a hydroxyl group, a carboxyl group, an amino group, or the like, which is capable of reacting with a porous carbon material, a molecular modification can be conducted.

According to a method for manufacturing a porous carbon material, by treating with an acid or an alkali, a silicon component in the plant-derived material after carbonization is allowed to be removed. Here, as a silicon component, silicon oxides such as silicon dioxide, silicon oxide, and silicon oxide salts can be mentioned. Thus, when the silicon component in the plant-derived material after carbonization is removed, a porous carbon material having a large specific surface area can be obtained. In some instances, a dry etching method may be used to remove the silicon component in the plant-derived material after carbonization. Further, for example, by dipping in an inorganic acid such as hydrochloric acid, nitric acid and sulfuric acid, a mineral component contained in the plant-derived material after carbonization may be removed.

Porous carbon materials in the present invention may have a plant-derived material as a raw material. Here, as a plant-derived material, husks and straws of rice, barley, wheat, rye, Japanese millet, foxtail millet, and the like; coffee beans, tea leaves (for example, leaves of green tea and black tea), sugar canes (more specifically, bagasse), corns (more specifically, cores of corns), above-described fruit skin (for example, skin of citrus fruits such as mandarin orange, and skin of banana), or reeds and Wakame stems can be mentioned without limiting thereto. Other than the above, for example, vascular plants that live on land, ferns, bryophytes, algae, and seaweeds can be mentioned. These materials may be used singularly or in a combination of several kinds thereof as a raw material. Further, both a shape and a form of the plant-derived material are not particularly limited, for example, husks or straws may be used as it is, or dried products can be used. Further, materials after various kinds of processing such as fermentation process, roasting process and extraction process, in food and beverage processing of beer, liquor or the like, can also be used. In particular, from the viewpoint of recycling industrial wastes, it is desirable that straws and husks after processing of threshing or the like are used. These straws and husks after processing can be abundantly and readily available, for example, from agriculture cooperatives, alcohol manufacturers, and food-processing companies.

In porous carbon materials in the present invention, non-metal elements such as magnesium (Mg), potassium (K), calcium (Ca), phosphorus (P) and sulfur (S), and metal elements such as transition elements may be contained. A content of magnesium (Mg) of 0.01% by mass or more and 3% by mass or less, a content of potassium (K) of 0.01% by mass or more and 3% by mass or less, a content of calcium (Ca) of 0.05% by mass or more and 3% by mass or less, a content of phosphorus (P) of 0.01% by mass or more and 3% by mass or less, and a content of sulfur (S) of 0.01% by mass or more and 3% by mass or less can be mentioned. Contents of these elements are desirable to be small from the viewpoint of an increase in a value of a specific surface area. A porous carbon material may contain other elements than the above elements, and it goes without saying that also ranges of contents of the various kinds of elements may be altered.

In porous carbon materials in the present invention, or in porous carbon materials making up filter media according to the fifth embodiment to eighth embodiment of the present invention, various kinds of elements can be analyzed by energy dispersive X-ray spectrometry with, for example, an energy dispersive X-ray spectrometer (for example, JED-2200F manufactured by JEOL). Here, measurement conditions may be set to, for example, a scanning voltage of 15 kV and an irradiation current of 10 µA.

Porous carbon materials in the present invention, or porous carbon materials making up filter media according to the fifth embodiment to eighth embodiment of the present invention, have many fine pores. As a fine pore, a "meso fine pore" having a pore diameter from 2 nm to 50 nm, a "micro fine pore" having a pore diameter smaller than 2 nm, and a "macro fine pore" having a pore diameter exceeding 50 nm are included. In a porous carbon material in the present invention, a volume of fine pores by an MP method is desirably 0.1 cm$^3$/g or more, as was described above.

In porous carbon materials in the present invention, or in porous carbon materials making up filter media according to the fifth embodiment to eighth embodiment of the present invention, a value of a specific surface area by a nitrogen BET method (hereinafter, in some cases, simply referred to as "value of specific surface area") is desirably $4 \times 10^2$ m$^2$/g or more for obtaining even better functionality.

The nitrogen BET method is a method in which nitrogen as adsorbate molecules is adsorbed onto and desorbed from the adsorbent (here, the porous carbon material) to measure an adsorption isotherm, and the measurement data is analyzed based on a BET formula represented by the formula (1). Based on this method, a specific surface area, a fine pore volume and the like can be calculated. Specifically, in the case of calculating the specific surface area by a nitrogen BET method, first, nitrogen as adsorbate molecules is adsorbed onto and desorbed from the porous carbon material to obtain the adsorption isotherm. Then, from the adsorption isotherm thus obtained, $[p/\{V_a(p_0-p)\}]$ is calculated based on the formula (1) or on the formula (1') obtained by modification of the formula (1), and the calculation result is plotted against the equilibrium relative pressure ($p/p_0$). Next, regarding the plot as a straight line, the inclination s $(=[(C-1)/(C \cdot V_m)])$ and the intercept i $(=[1/(C \cdot V_m)])$ of the straight line are calculated based on the least squares method. Then, from the inclination s and the intercept i thus obtained, $V_m$ and C are calculated based on the formula (2-1) and the formula (2-2). Further, the specific surface area $a_{sBET}$ is calculated from $V_m$ based on the formula (3) (see the manual for BELSORP-mini and BELSORP analysis software, made by BEL Japan, Inc., pp. 62 to 66). Incidentally, the nitrogen BET method is a measuring method according to the "Measuring method for specific surface area of fine ceramic powders by gas adsorption BET method" defined by JIS R 1626-1996.

$$V_a = (V_m C \cdot p)/[(p_0 \cdot p)\{1+(C-1)(p/p_0)\}] \tag{1}$$

$$[p/\{V_a(p_0-p)\}] = [(C-1)/(C \cdot V_m)](p/p_0) + [1/(C \cdot V_m)] \tag{1'}$$

$$V_m = 1/(s+i) \tag{2-1}$$

$$C = (s/i)+1 \tag{2-2}$$

$$a_{sBET} = (V_m L \cdot \sigma)/22414 \tag{3}$$

where
$V_a$: adsorption amount;
$V_m$: adsorption amount of monomolecular layer;
p: pressure of nitrogen at equilibrium;
$p_0$: saturated vapor pressure of nitrogen;
L: Avogadro's number; and
σ: adsorption cross section of nitrogen.

In the case of calculating the fine pore volume $V_p$ by the nitrogen BET method, for example, linear interpolation is applied to the adsorption data of the adsorption isotherm obtained, and the adsorption amount V at a relative pressure set by a fine pore volume calculation relative pressure is obtained. From this adsorption volume V, the fine pore volume $V_p$ can be calculated based on the formula (4) (see the Manual for BELSORP-mini and BELSORP analysis software, made by BEL Japan, Inc., pp. 62 to 65). Incidentally, the fine pore volume based on the nitrogen BET method may hereinafter be referred to simply as "fine pore volume").

$$V_p = (V/22414) \times (M_g/\rho_g) \tag{4}$$

where
V: adsorption amount at relative pressure;
$M_g$: molecular weight of nitrogen; and
$\rho_g$: density of nitrogen.

The pore diameter of meso fine pores can, for example, be calculated as a pore size distribution from the fine pore volume variation rate relative to the pore diameter, based on the BJH method. The BJH method is a method that is widely used as a pore size distribution analyzing method. In the case of analyzing the pore size distribution based on the BJH method, first, nitrogen as adsorbate molecules is adsorbed onto and desorbed from a porous carbon material to obtain a desorption isotherm. Next, based on the desorption isotherm thus obtained, a thickness of an adsorbed layer at the time of stepwise adsorption/desorption of adsorbate molecules from the condition where the fine pores are filled with the adsorbate molecules (for example, nitrogen) and an inside diameter (twice the core radius) of the pores generated in that instance are obtained, then the fine pore radius $r_p$ is calculated based on the formula (5), and the fine pore volume is calculated based on the formula (6). Then, based on the fine pore radius and the fine pore volume, the fine pore volume variation rate $(dV_p/dr_p)$ relative to the pore diameter $(2r_p)$ is plotted, whereby the pore size distribution curve is obtained (see the Manual for BELSORP-mini and BELSORP analysis software, made by BEL Japan, Inc., pp. 85 to 88).

$$r_p = t + r_k \tag{5}$$

$$V_{pn} = R_n dV_n - R_n \cdot dt_n \cdot c \cdot \Sigma A_{pj} \tag{6}$$

where $$R_n = r_{pn}^2 / (r_{kn-1} + dt_n)^2 \tag{7}$$

where
$r_p$: fine pore radius;
$r_k$: core radius (inside diameter/2) in the case where an adsorbed layer with a thickness t is adsorbed on the inner wall of fine pores with a fine pore radius $r_p$ at that pressure;
$V_{pn}$: fine pore volume when n-th adsorption/desorption of nitrogen is generated;
$dV_n$: variation in that instance;
$dt_n$: variation of thickness $t_n$ of the adsorbed layer when the n-th adsorption/desorption of nitrogen is generated;
$r_{kn}$: core radius in that instance;
c: constant; and
$r_{pn}$: pore diameter when the n-th adsorption/desorption of nitrogen is generated. Besides, $\Sigma A_{pj}$ is the integrated value of the area of wall surfaces of fine pores from j=1 to j=n−1.

The pore diameter of micro fine pores can be calculated as a pore size distribution from the fine pore volume variation rate relative to the pore diameter, based on, for example, the MP method. In the case of analyzing the pore size distribution by the MP method, first, nitrogen is adsorbed onto the porous carbon material to obtain an adsorption isotherm. Next, the adsorption isotherm is converted into fine pore volume relative to a thickness t of the adsorbed layer (plotted against t). Then, based on the curvature of the plot (variation of fine pore volume relative to variation in thickness t of adsorbed layer), a pore size distribution curve can be obtained (see the Manual for BELSORP-mini and BELSORP analysis software, made by BEL Japan, Inc., pp. 72 to 73 and p. 82).

In the non-localized density functional theory method (NLDFT method) specified in JIS Z8831-2: 2010 "A fine pore distribution and fine pore characteristics of powder (solid)—the second part: A method of measuring a meso fine pore and a macro fine pore based on gas adsorption" and JIS Z8831-3: 2010 "A pore diameter distribution and fine pore characteristics of powder (solid)—the third part: A method of measuring a micro fine pore based on gas adsorption", a software that comes with an automatic specific surface area/fine pore distribution measuring apparatus "BELSORP-MAX" manufactured by BEL JAPAN, INC. is used as analysis software. A model is formed so as to have a cylindrical shape and carbon black (CB) is assumed as the prerequisite, and a distribution function of a fine pore distribution parameter is set as "no-assumption". The smoothing is carried out ten times for the resulting distribution data.

The porous carbon material precursor is treated with an acid or an alkali. In this case, as a specific treatment method, for example, a method of dipping the porous carbon material precursor in an aqueous solution of an acid or an alkali, or a method of causing the porous carbon material precursor and an acid or an alkali to react with each other in a gas phase can be mentioned. More specifically, when the porous carbon material precursor is treated with an acid, a fluorine compound that shows an acidic property, such as hydrogen fluoride, a hydrofluoric acid, ammonium fluoride, calcium fluoride and sodium fluoride can be mentioned. When the fluorine compound is used, an amount of fluorine elements may be four times larger than the amount of silicon elements in a silicon component contained in the porous carbon material precursor, and a concentration of a fluorine compound aqueous solution is desirably 10% by mass or more. When the silicon components (such as the silicon dioxide) contained in the porous carbon material precursor are removed away by using a hydrofluoric acid, the silicon dioxide reacts with the hydrofluoric acid as shown either in Chemical Formula (A) or in Chemical Formula (B) and is removed away either as a hexafluorosilicic acid ($H_2SiF_6$) or as silicon tetrafluoride ($SiF_4$). Thus, a porous carbon material can be obtained. Then, after that, the rinsing and the drying may be conducted. When a porous carbon material precursor is treated with an acid, by treating with an inorganic acid such as hydrochloric acid, nitric acid and sulfuric acid, mineral components contained in the porous carbon material precursor can be removed.

$$SiO_2 + 6HF \rightarrow H_2SiF_6 + 2H_2O \tag{A}$$

$$SiO_2 + 4HF \rightarrow SiF_4 + 2H_2O \tag{B}$$

On the other hand, when the porous carbon material precursor is treated with an alkali (base), sodium hydroxide, for example, can be used as the alkali. When an aqueous solution of the alkali is used, pH of an aqueous solution may be 11 or more. When the silicon components (for example, silicon dioxide) contained in the porous carbon material precursor are removed away with an aqueous solution of sodium hydroxide, silicon dioxide reacts with the sodium hydroxide as shown in chemical formula (C) by heating the aqueous solution of sodium hydroxide and is removed away as sodium silicate ($Na_2SiO_3$), thereby a porous carbon material can be obtained. Also, when the porous carbon material precursor is treated by reacting with sodium hydroxide in a gas phase, silicon dioxide reacts with the sodium hydroxide as shown in chemical formula (C) by heating a solid substance of sodium hydroxide and is removed away as sodium silicate ($Na_2SiO_3$), thereby a porous carbon material can be obtained. Then, after that, the rinsing and the drying may be conducted.

$$SiO_2 + 2NaOH \rightarrow Na_2SiO_3 + H_2O \tag{C}$$

Or, as porous carbon materials in the present invention, or, porous carbon materials that form filter media according to the fifth to eighth embodiments of the present invention, for example, also a porous carbon material disclosed in Japanese Unexamined Patent Application Publication No. 2010-106007 which includes vacancies having three-dimensional regularity (porous carbon material having a so-called inverted-opal structure), specifically, a porous carbon material which includes spherical vacancies that have an average diameter of $1 \times 10^{-9}$ to $1 \times 10^{-5}$ m being three-dimensionally disposed, and which has the specific surface area of $3 \times 10^2$ $m^2/g$ or more. Desirably, a porous carbon material which includes vacancies disposed in an arrangement corresponding macroscopically to a crystal structure, or vacancies disposed on a surface thereof in an arrangement macroscopically corresponding to a (111) plane orientation in a face-centered cubic structure can be used.

Example 1

Example 1 relates to decontaminants according to the first to fourth embodiments of the present invention, carbon/polymer composites according to the first to fourth embodiments of the present invention, decontamination sheet members according to the first to fourth embodiments of the present invention, and filter media according to the first to fourth embodiments of the present invention.

A decontaminant or a filter medium of Example 1 is formed of a porous carbon material that, according to an expression of a decontaminant or a filter medium according to the first embodiment of the present invention, has a value of a specific surface area by the nitrogen BET method of $1 \times 10^2$ m$^2$/g or more, a volume of fine pores based on a BJH method of 0.3 cm$^3$/g or more, desirably 0.4 cm$^3$/g or more, and more desirably 0.5 cm$^3$/g or more, and a particle size of 75 μm or more. Further, the decontaminant or the filter medium of Example 1 is formed of a porous carbon material that, according to an expression of a decontaminant or a filter medium according to the second embodiment of the present invention, has a value of a specific surface area by the nitrogen BET method of $1 \times 10^2$ m$^2$/g or more, a total of volumes of fine pores having a diameter of $1 \times 10^{-9}$ m to $5 \times 10^{-7}$ m obtained according to the non-localized density functional theory (NLDFT method) (referred to as "volume A" for convenience) of 1.0 cm$^3$/g or more, and a particle size of 75 μm or more. Still further, the decontaminant or the filter medium of Example 1 is formed of a porous carbon material that, according to an expression of a decontaminant or a filter medium according to the third embodiment of the present invention, has a value of a specific surface area by the nitrogen BET method of $1 \times 10^2$ m$^2$/g or more, at least one peak in the range of 3 nm to 20 nm, in a pore diameter distribution obtained by a non-localized density function theory, a ratio of a total of volumes of fine pores having pore diameters in the range of 3 nm to 20 nm, with respect to a sum total of volumes of all fine pores, of 0.2 or more, and a particle size of 75 μm or more. Furthermore, the decontaminant or the filter medium of Example 1 is formed of a porous carbon material that, according to an expression of a decontaminant or a filter medium according to the fourth embodiment of the present invention, has a value of a specific surface area by the nitrogen BET method of $1 \times 10^2$ m$^2$/g or more, a volume of fine pores by mercury porosimetry of 1.0 cm$^3$/g or more, and a particle size of 75 μm or more.

Fine pores (meso fine pores) by the BJH method, fine pores (micro fine pores) by the MP method, and fine pores by the mercury porosimetry are obtained by removing, at least, silicon from a plant-derived material containing silicon. A volume of fine pores of the porous carbon material by the mercury porosimetry is more desirably 2.0 cm$^3$/g or more, and a volume of fine pores by the MP method is desirably 0.1 cm$^3$/g or more. Further, the bulk density of the porous carbon material is desirably 0.1 g/cm$^3$ to 0.8 g/cm$^3$.

In Example 1, as a plant-derived material that is a raw material of the porous carbon material, rice (paddy) husk was used. The porous carbon material in Example 1 is obtained by carbonizing husk as a raw material into a carbonaceous substance (porous carbon material precursor), followed by treating with an acid. Hereinafter, a method for manufacturing a porous carbon material in Example 1 will be described.

In manufacture of a porous carbon material in Example 1, a plant-derived material was carbonized at 400° C. to 1400° C. and, after that, by treating with an acid or an alkali, a porous carbon material was obtained. That is, firstly, husks of rice were heated (pre-carbonizing treatment) in an inert gas atmosphere. Specifically, husks of rice were carbonized by heating at 500° C. for 5 hours in a nitrogen gas flow to obtain a carbide. When such a treatment is applied, a tar component to be generated in the following carbonizing treatment can be reduced or removed. Thereafter, 10 g of the carbide was charged in an alumina crucible and heated up to 800° C. at a rate of temperature increase of 5° C./min in a nitrogen gas flow (10 L/min). Then, after carbonizing at 800° C. for 1 hour to convert to a carbonaceous substance (porous carbon material precursor), the carbonaceous substance was cooled to room temperature. During carbonizing and cooling, a nitrogen gas was continued to flow. Next, the porous carbon material precursor was treated with an acid by dipping in an aqueous solution of 46% by volume of hydrofluoric acid overnight, and, after that, the resultant was washed using water and ethyl alcohol until pH7 was obtained. Then, after drying at 120° C., by activating by heating at 900° C. for 3 hours in a water vapor (5 L/min), a porous carbon material of Example 1 was obtained. When the porous carbon material of Example 1 was pulverized and sieved, and a portion of 60 mesh pass and 200 mesh on product was sampled, Example 1A was obtained.

By sieving a filter medium used in a commercially available water cleaner, portions of 60 mesh pass and 200 mesh on product were sampled as Comparative Example 1A and Comparative Example 1B. A filter medium in Comparative Example 1A is formed of silica, and a filter medium in Comparative Example 1B is formed of bamboo charcoal.

BELSORP-mini (manufactured by BEL JAPAN INC.) was used as a measurement instrument for obtaining the specific surface area and the fine pore volume, and a test for adsorbing and desorbing nitrogen was carried out. With regard to the measurement condition, a measurement equilibrium relative pressure (p/p$_0$) was set in the range of 0.01 to 0.99. Also, the specific surface area and the fine pore volume were calculated based on the BELSORP analysis software. In addition, the test for adsorbing and desorbing nitrogen was carried out by using the measurement instrument described above, thereby calculating the pore diameter distribution of the meso fine pores and the micro fine pores based on both the BJH method and the MP method using the BELSORP analysis software. In addition, the automatic specific surface area/pore distribution measuring apparatus "BELSORP-MAX" manufactured by BEL JAPAN, INC. was used for the analysis based on the non-localized density functional theory method. It is noted that for the measurement, drying was carried out at 200° C. for 3 hours as a pretreatment for a specimen.

When a specific surface area and a volume of fine pores of each of filter media of Example 1A, Comparative Example 1A and Comparative Example 1B were measured, results shown in Table 1 were obtained. In Table 1, a "specific surface area" indicates a value of a specific surface area by the nitrogen BET method, and a unit thereof is m$^2$/g. Further, a "MP method" and a "BJH method" indicate measurement results of volumes of fine pores (micro fine pores) by the MP method and measurement results of volumes of fine pores (meso fine pore to macro fine pore) by the BJH method, respectively, and a unit thereof is cm$^3$/g. Further, in Table 1, a "volume of all fine pores" indicates a value of a volume of all fine pores by the nitrogen BET method, and a unit thereof is cm$^3$/g. Still further, a ratio (volume ratio) of a total of volumes of fine pores having a pore diameter in the range of 3 nm to 20 nm with respect to a total of volumes (volume A, sum total of volumes of all fine pores) of fine pores having a pore diameter of $1 \times 10^{-9}$ m to $5 \times 10^{-7}$ m based on the non-localized density functional theory method (NLDFT method) is shown in Table 2. Here, although measurement results of a fine pore volume based on the BJH method and a sum total of volumes of all fine pores (volume A) based on the NLDFT method show large values in Comparative Example 1, this is because a filter medium in Comparative Example 1A is not formed of a porous carbon material but is formed of silica.

In order to measure an adsorption amount, aqueous solutions each containing 0.03 mol/L of Methylene blue and 0.5 mmol/L of Black 5 were prepared, 10 mg of a specimen was charged in each of 40 ml aqueous solutions. The solutions were stirred at 100 rpm with a mix rotor (stirrer) for 0.5 minute, 1 minute, 3 minutes, 5 minutes, 15 minutes, 30 minutes, 60 minutes and 180 minutes, after stirring, the solutions were filtrated, and, based on a test method that measures an absorbance change of the resulted filtrate, a relationship between a stirring time and an adsorption amount of each of Methylene blue and Black 5 per 1 g of filter medium was calculated from a value of a calibration curve obtained from absorbance per unit mass.

Results thereof are shown in (A) and (B) of FIG. 1. Adsorption amounts of Methylene blue and Black 5 of a filter medium of Example 1A are remarkably larger than those of filter media of Comparative Example 1A and Comparative Example 1B. This is considered that it is because a large volume of meso fine pores and macro fine pores, which are not observed in Comparative Examples, had an influence. Here, a vertical axis in FIG. 1 shows an adsorption amount (unit: mg/g), and a horizontal axis shows a test time (time during which a filter medium is dipped in a test liquid, unit thereof is minute). Further, a triangle mark shows data of Example 1A, a square mark shows data of Comparative Example 1A, and a circle mark shows data of Comparative Example 1B.

Further, a filter medium of Example 1, in another manufacture lot, was manually pulverized with a mortar as a filter medium of Example 1B. The filter medium of Example 1B includes a 200 mesh on product and has a particle size from 0.50 mm to 0.85 mm. Further, a filter medium of a simultaneously obtained 200 mesh pass product was taken as Reference Example 1. By measuring a specific surface area and a fine pore volume, results shown in Table 1 were obtained. Still further, activated carbons were taken out of commercially available water cleaners and activated carbons having a particle size from 0.50 mm to 0.85 mm were sampled, and these were evaluated as Comparative Example 1C and Comparative Example 1D.

Figure 2:
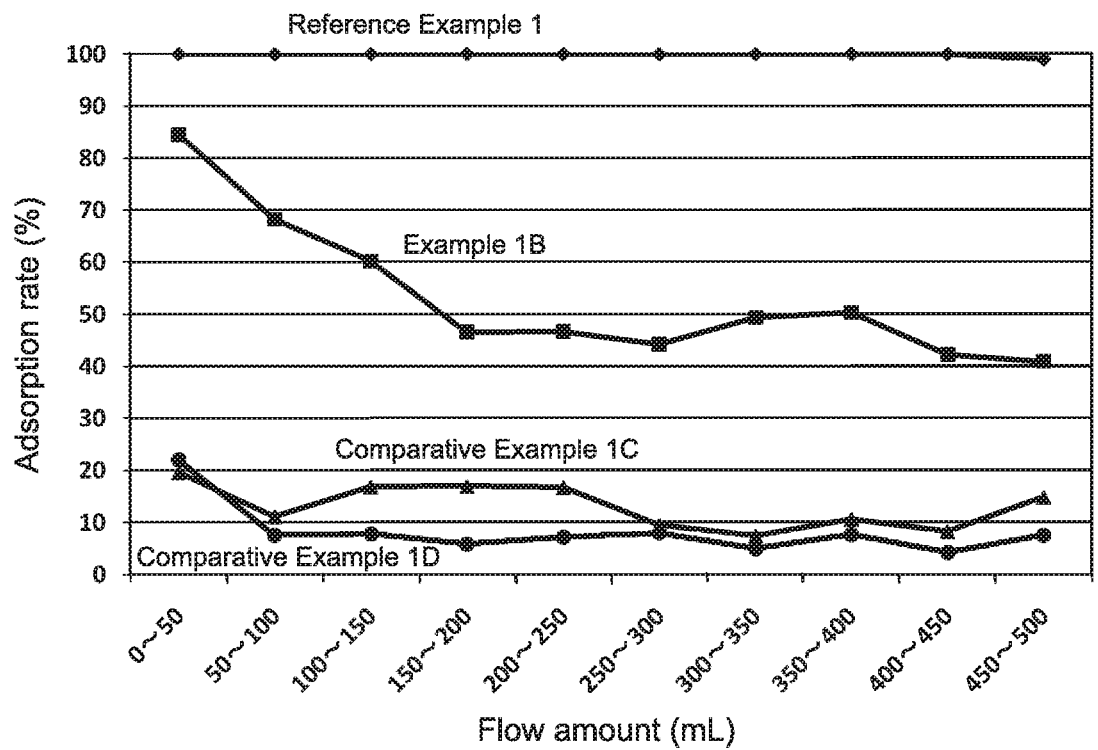
FIG. 2 is a graph showing results when each of specimens of Example 1B, Reference Example 1, Comparative Example 1C and Comparative Example 1D is charged in a cartridge, an aqueous solution of Methylene blue flowed in the cartridge and a concentration of Methylene blue in water flowed out of the cartridge was measured.

Further, 200 mg of each of specimens of Example 1B, Reference Example 1, Comparative Example 1C and Comparative Example 1D was charged in a cartridge, an aqueous solution of Methylene blue was flowed to the cartridge at a flow rate of 50 mL/minute, and a concentration of Methylene blue of water flowed out of the cartridge was measured. Results thereof are shown in FIG. 2. In FIG. 2, a vertical axis shows an adsorption rate (removal rate) of Methylene blue, which is a value obtained by normalizing with an adsorption amount (removal rate) of a filter medium of Reference Example 1 set to 100%. Further, a horizontal axis shows a flow rate of an aqueous solution of Methylene blue. It is obvious also from FIG. 2 that Methylene blue adsorption amounts of filter media of Example 1B (shown with square) and Reference Example 1 (shown with rhombus) are remarkably larger than that of Comparative Example 1C (shown with triangle) or Comparative Example 1D (shown with circle).

Figure 3:
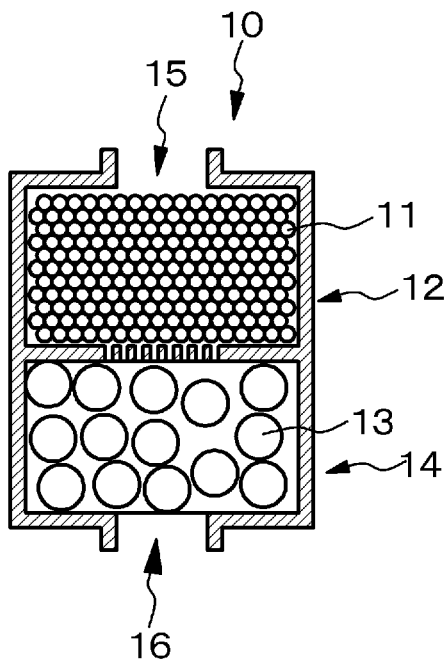
FIG. 3 is a schematic sectional view of a water cleaner.

A sectional view of a water cleaner of Example 1 is shown in FIG. 3. The water cleaner of Example 1 is a continuous water cleaner and a faucet-coupled water cleaner where a water cleaner body is directly attached to an tip part of a water faucet. The water cleaner of Example 1 includes a water cleaner body 10, a first packing part 12 that is disposed inside the water cleaner body 10 and in which a porous carbon material 11 of Example 1A or Example 1B, or Reference Example 1 is packed, and a second packing part 14 in which cotton 13 is packed. Tap water discharged from a water faucet passes from an inlet 15 disposed to the water cleaner body 10 through a porous carbon material 11 and cotton 13 and is discharged from an outlet 16 disposed to the water cleaner body 10.

Figure 4:
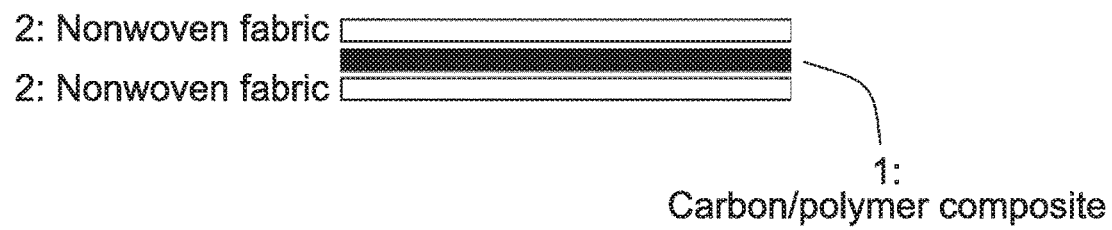
FIG. 4 is a diagram showing a schematic sectional structure of a decontamination sheet member of Example 1.

A schematic diagram showing a sectional structure of a decontamination sheet member of Example 1 is shown in FIG. 4. The decontamination sheet member of Example 1 includes a porous carbon material of Example 1A or Example 1B, or Reference Example 1, and, a support member. Specifically, the decontamination sheet member of Example 1 has a structure where between a support member (nonwoven fabric 2) and another support member (nonwoven fabric 2), which are composed of cellulose, a sheet-like porous carbon material, that is, a carbon/polymer composite 1 is sandwiched. The carbon/polymer composite 1 includes a porous carbon material of Example 1A or Example 1B, or Reference Example 1, and a binder, and the binder includes, for example, carboxy nitrocellulose. A decontamination sheet member can be formed also by coating a porous carbon material of Example 1A or Example 1B, or, Reference Example 1 on a support member, or by blending a porous carbon material of Example 1 in a support member.

Example 2

Example 2 is modification of Example 1. In Example 2, an evaluation test of a removal rate of chlorine was conducted.

In manufacture of a porous carbon material in Example 2, a plant-derived material was carbonized at 400° C. to 1400° C. and, after that, by treating with an acid or an alkali, a porous carbon material was obtained. That is, firstly, husks of rice were heated (pre-carbonizing treatment) in an inert gas atmosphere. Specifically, husks of rice were carbonized by heating at 500° C. for 5 hours in a nitrogen gas flow to obtain a carbide. When such a treatment is applied, a tar component to be generated in the following carbonizing treatment can be reduced or removed. Thereafter, 10 g of the carbide was charged in an alumina crucible and heated up to 800° C. at a rate of temperature increase of 5° C./min in a nitrogen gas flow (10 L/min). Then, after carbonizing at 800° C. for 1 hour to convert to a carbonaceous substance (porous carbon material precursor), the carbonaceous substance was cooled to room temperature. During carbonizing and cooling, a nitrogen gas was continued to flow. Next, the porous carbon material precursor was treated with an acid by dipping in an aqueous solution of 46% by volume of hydrofluoric acid overnight, and, after that, the resultant was washed using water and ethyl alcohol until pH7 was obtained. Then, after drying at 120° C., by activating by heating at 900° C. for 3 hours in a water vapor (3.5 L/min), a porous carbon material of Example 2 was obtained.

By measuring a specific surface area and a volume of fine pores of a filter medium in Example 2, results shown in Table 1 were obtained. By pulverizing a filter medium of Example 2 to control a particle size, a 200 mesh on product was obtained. Example 2A and Example 2B having two kinds of particle size distributions were prepared. Measurement results of particle size distribution with a sieve are shown in Table 3. Further, activated carbons were taken out of commercially available water cleaners, and these were evaluated as Comparative Example 2A, Comparative Example 2B and Comparative Example 2C. Further, masses (unit: gram) when the respective specimens were packed in first packing parts 12 having the same volume are shown in Table 1. A packing ratio when each of the specimens is packed in the first packing part 12 is called as "packing rate" in some cases. Further, volume ratios of a total of volumes of fine pores having a pore diameter in the range of 3 nm to 20 nm with respect to a total of volumes of fine pores (sum total of volumes of all fine pores) having a diameter of $1\times10^{-9}$ m to $5\times10^{-7}$ m based on the NLDFT method are shown in Table 2. Still further, measurement results by mercury porosimetry are shown below. Further, measurement results of residue on ignition (ash residue) remained when specimens dried at 120° C. for 12 hours were heated up to 800° C. under dry air of 300 mL/min based on a thermogravimetric method (TG) are shown below. Measurement results of the residue on ignition (ash residue) in porous carbon materials of Example 1 and Example 7, and measurement results of the residue on ignition (ash residue) in porous carbon material precursors before acid treatment are also shown together.

[Measurement Results by Mercury Porosimetry]

| | |
|---|---|
| Example 2 | 4.12 cm$^3$/g |
| Comparative Example 2A | 0.26 cm$^3$/g |
| Comparative Example 2B | 0.35 cm$^3$/g |
| Comparative Example 2C | 0.24 cm$^3$/g |

[Residue on Ignition]

| | |
|---|---|
| Example 1 | 5.83% |
| Example 2 | 3.49% |
| Example 7 | 7.29% |
| Porous carbon material precursor | 43.27% |

Figure 5:
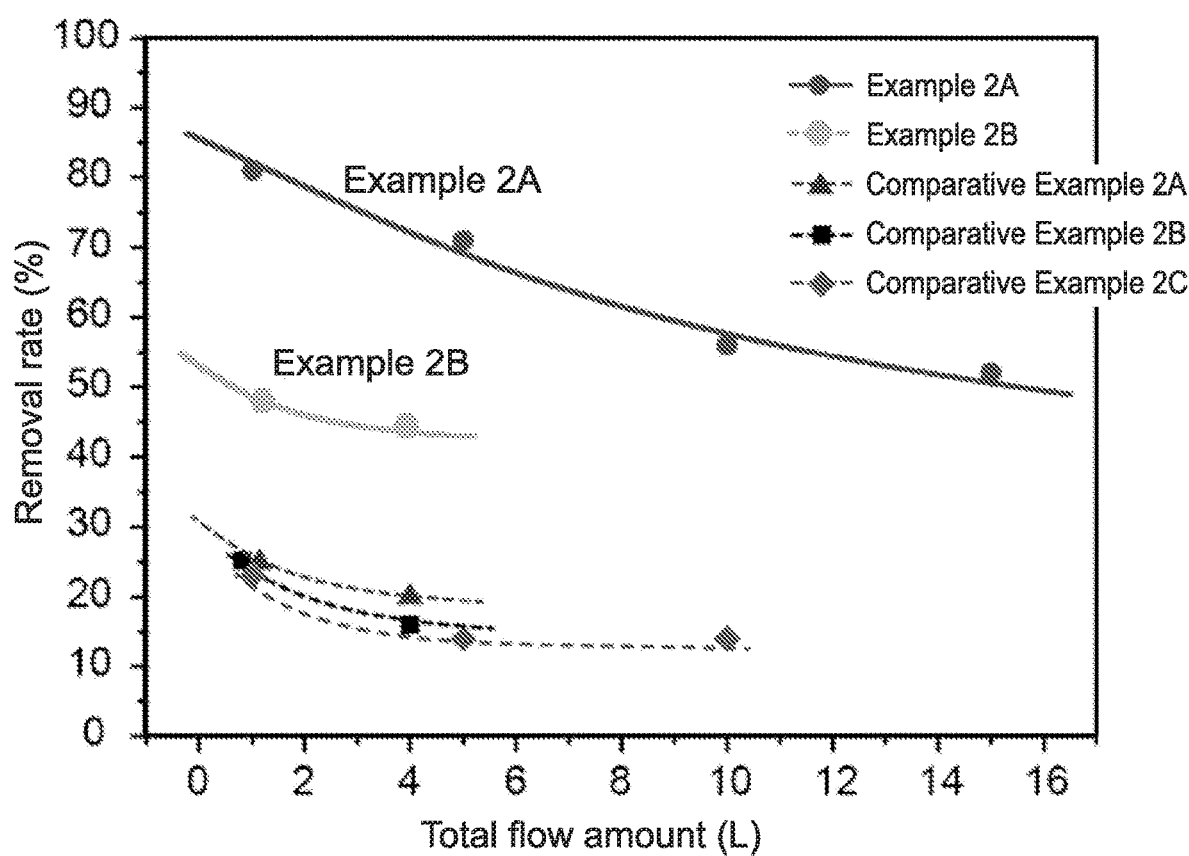
FIG. 5 is a graph showing chlorine removal rates of filter media of porous carbon materials of Example 2, and filter media of Comparative Example 2A, Comparative Example 2B and Comparative Example 2C.

In the test, a glass tube having an inner diameter of 7.0 mm was packed with each of specimens having a volume of 2 mL, and water having a chlorine concentration of 2.0 mg/L was flowed into the glass tube at a flow rate of 400 mL/min. Measurement results of chlorine removal rate obtained based on a method that removal rate based on DPD adsorption photometry (%)=(measurement of raw water−measurement of passing water)/measurement of raw water× 100 are shown in FIG. 5. A flow rate of 400 mL/min is as follows, in terms of spatial velocity (SV).

$SV=400\times60$ (mL/hr)/2 cm$^3$=12000 hr$^{-1}$

From FIG. 5, it is found that filter media made of porous carbon materials of Example 2A and Example 2B have chlorine removal rates remarkably higher than those of Comparative Example 2A, Comparative Example 2B, and Comparative Example 2C.

Example 3

Also Example 3 is a modification of Example 1. In Example 3, evaluation tests of a removal rate of chlorine, a removal rate of 1,1,1-trichloroethane, and a removal rate of 2-chloro-4,6-bisethylamino-1,3,5-triazine (CAT) were conducted. A removal rate was calculated from the following formula by gas chromatography. As a porous carbon material that forms a filter medium of Example 3, a porous carbon material (200 mesh on product) of Example 2A was used. As Comparative Example 3, a filter medium the same as that of Comparative Example 2C was used.

Removal rate (%)=(measurement of raw water−measurement of passing water)/measurement of raw water×100

Figure 6:
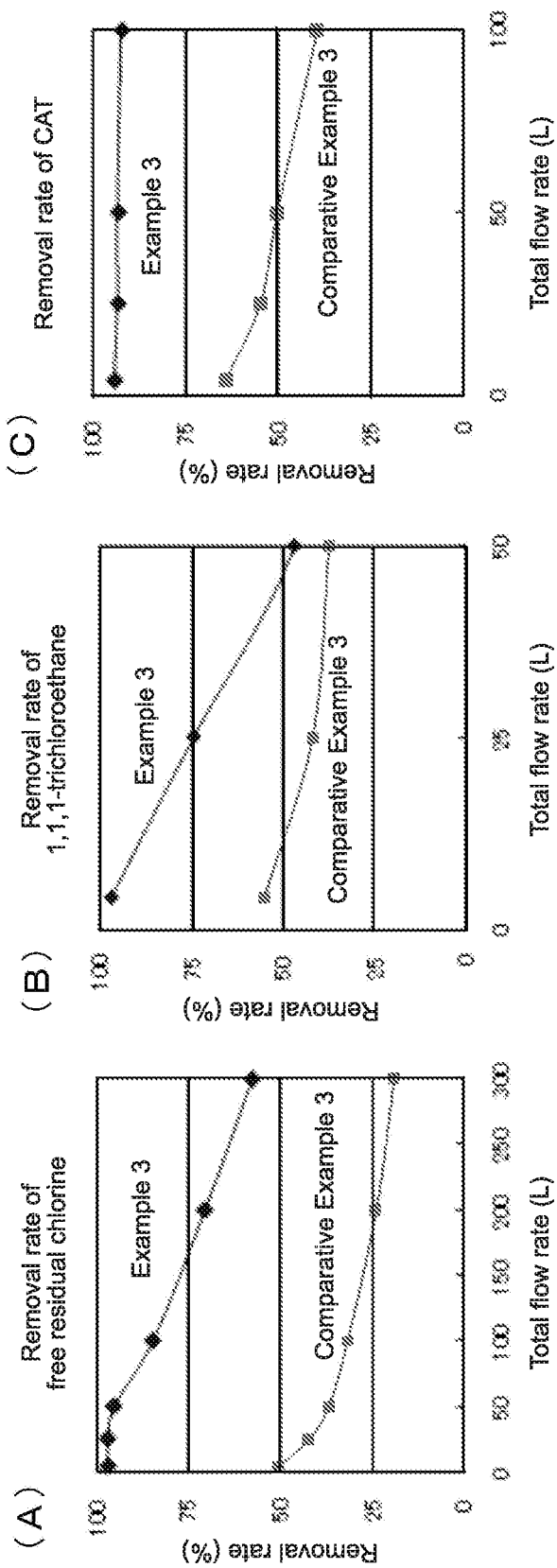
FIGS. 6 (A), (B) and (C) of FIG. 6 are graphs each showing removal rates of each of chlorine, 1,1,1-trichloroethane, and CAT in a filter medium of a porous carbon material of Example 3 and a filter medium of Comparative Example 3.

With filter media of Example 3 and Comparative Example 3, glass tubes having an inner diameter of 10.0 mm were packed with each of specimens having a volume of 10 mL, and each of water having a chlorine concentration of 2.0 mg/L, an aqueous solution of 1,1,1-trichloroethane of a concentration of 0.3 mg/L, and an aqueous solution of CAT of a concentration of 0.003 mg/L was flowed at a flow rate of 400 mL/min into a glass tube. Removal rates of chlorine, 1,1,1-trichloroethane, and CAT are shown in (A), (B) and (C) of FIG. 6. From (A), (B) and (C) of FIG. 6, it was found that a filter medium formed of a porous carbon material of Example 3 has a removal rate remarkably higher than that of Comparative Example 3. A flow rate of 400 mL/min is as follows, in terms of spatial velocity (SV).

$SV=400\times60$ (mL/hr)/10 cm$^3$=2400 hr$^{-1}$

Example 4

In eutrophicated lakes and ponds, mainly in summer, in some cases, blue algae (microcystis and the like) extraordinarily propagate to form a thick layer as if a water surface has a green bloom. This is called as blue-green algae. The blue algae are known to generate toxins harmful to a human body. Among many toxins, a toxin called microcystin LR is particularly alarming. When microcystin LR enters a living body, a liver is largely damaged. Its toxicity is reported in an experiment with mice. Toxic blue green algae that generate microcystin LR propagate in lakes in Australia, Europe and USA and in various places in Asia. In lakes in China, in which a damage is large, blue-green algae that have drastically increased in lakes do not disappear all year long. Since the lakes are used for drinkable water and agricultural water, toxins generated by the blue-green algae in lakes are problematic also in ensuring human drinkable water, and it is strongly demanded that the problem is solved.

In Example 4, adsorption of microcystin LR (number average molecular weight: 994) was evaluated. A porous carbon material that forms a filter medium of Example 4 was obtained according to a method roughly the same as that described in Example 1. Specifically, in Example 4, an activation treatment was conducted by heating at 900° C. for 3 hours in a water vapor flow (2.5 L/min). Except this point, a method the same as that described in Example 1 was used for obtaining the porous carbon material. A specific surface area and a volume of fine pores of a filter medium in Example 4 were measured, and results shown in Table 1 were obtained. A volume ratio of a total of volumes of fine pores having a pore diameter in the range of 3 nm to 20 nm with respect to a total of volumes of fine pores (volume A, sum total of volumes of all fine pores) having a diameter of $1\times10^{-9}$ m to $5\times10^{-7}$ m based on the NLDFT method is shown in Table 2. A filter medium in Example 4 is a 60 mesh pass and 200 mesh on product. Further, as Comparative Example 4, particulate activated carbon (60 mesh pass and 200 mesh on product) manufactured by Wako Pure Chemical Industries Ltd. was used.

Figure 7:
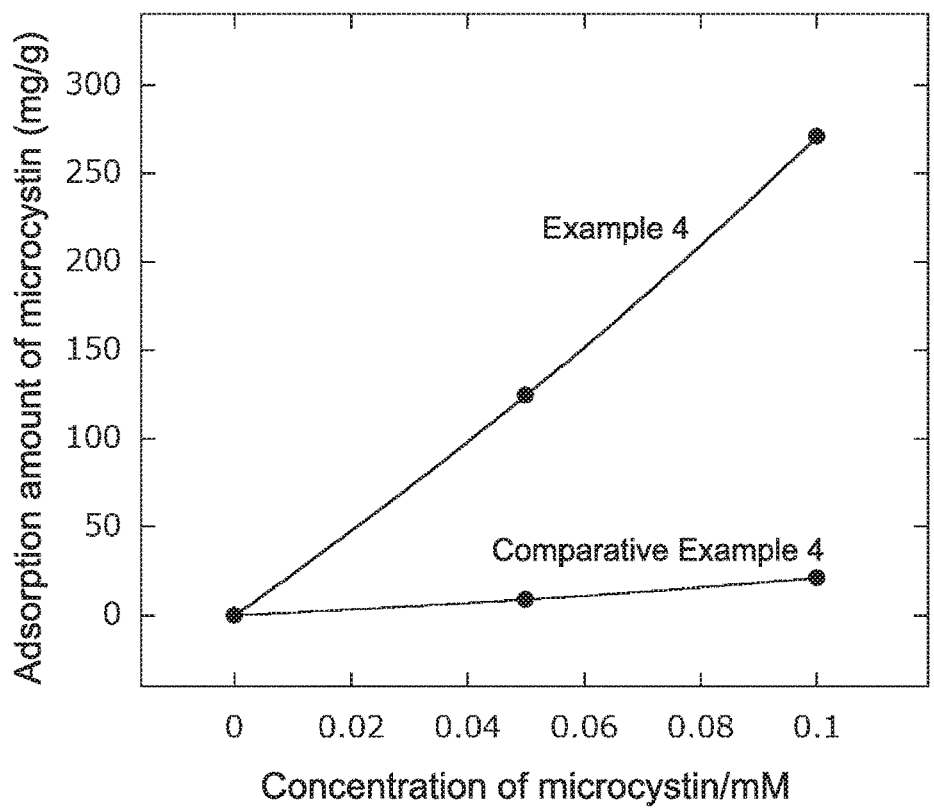
FIG. 7 is a graph showing removal rates of microcystin LR in a filter medium of a porous carbon material of Example 4 and in a filter medium of Comparative Example 4.

Microcystin concentrations of solutions of filter media of Example 4 and Comparative Example 4 were obtained before and after the reaction by colorimetry with a UV/visible spectrophotometer, and removal rates thereof were calculated. Results thereof are shown in FIG. 7. It was found that a filter medium formed of a porous carbon material of Example 4 has a removal rate remarkably higher than that of Comparative Example 4.

Example 5

In Example 5, particle size dependency was evaluated. As a porous carbon material that forms a filter medium of Example 5, a porous carbon material (60 mesh pass and 200 mesh on product) in Example 1 was used. Further, a 200 mesh pass product of the porous carbon material of Example 1 was used as Reference Example 5. Still further, as Comparative Example 5A, particulate activated carbon (60 mesh pass and 200 mesh on product) was used, and as Comparative Example 5B, a 200 mesh pass product obtained by pulverizing the particulate activated carbon of Comparative Example 4 was used.

Figure 8:
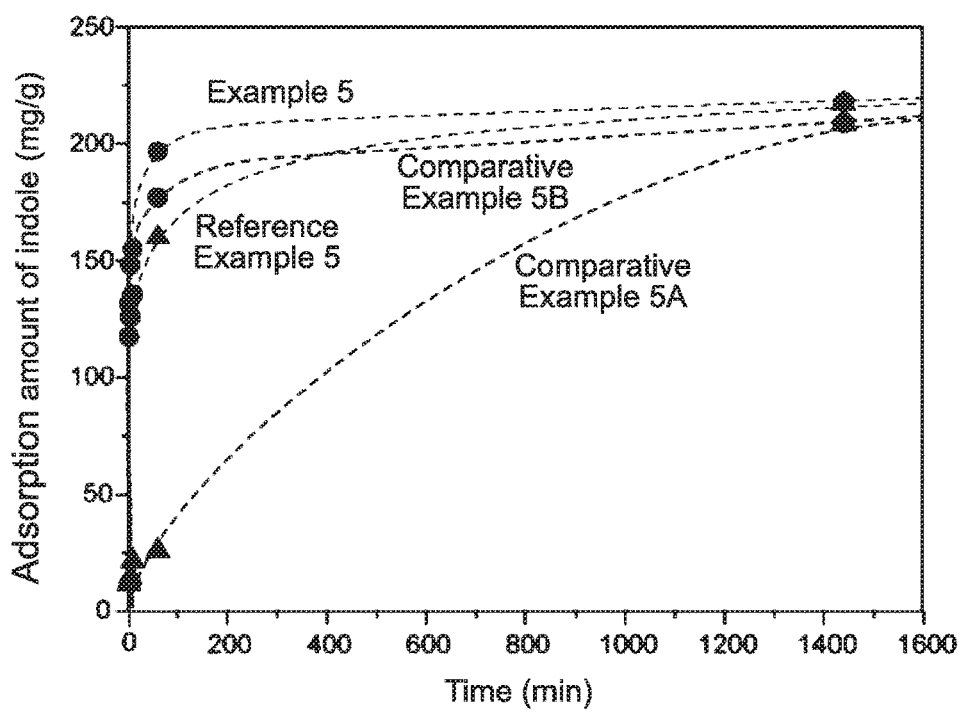
FIG. 8 is a graph showing high speed adsorption characteristics and particle size dependency in a filter medium of a porous carbon material of Example 5 and a filter medium of Comparative Example 5.

By using each of filter media of Example 5, Reference Example 5, Comparative Example 5A and Comparative Example 5B as a specimen, 10 mg of the specimen and 50 mL of indole solution ($3 \times 10^{-4}$ mol/L) were charged in a 50 mL screw tube, and, based on a method of quantifying an indole adsorption amount after 1 hour, particle size dependency was evaluated. Results thereof are shown in FIG. 8. It was found that filter media formed of porous carbon materials of Example 5 and Reference Example 5 are free from particle size dependency compared with those of Comparative Example 5A and Comparative Example 5B.

Example 6

The existing activated carbons obtained from a coconut shell or petroleum pitch as a raw material are used in a filter member for water purification and the like, and also in functional foods, cosmetics and the like. However, these activated carbons contain less mineral components and are not suitable for controlling a releasing amount of minerals into water and the like.

Example 6 relates to filter media according to the fifth embodiment to eighth embodiment of the present invention. A filter medium of Example 6 includes a porous carbon material having a value of a specific surface area by the nitrogen BET method of $1 \times 10^2$ m$^2$/g or more, a volume of fine pores by the BHJ method of 0.1 cm$^3$/g or more, and having a plant containing at least one kind of component selected from the group consisting of sodium, magnesium, potassium and calcium as a raw material. Alternatively, a filter medium of Example 6 includes a porous carbon material having a value of a specific surface area by the nitrogen BET method of $1 \times 10^2$ m$^2$/g or more, a total of volumes of fine pores having a diameter of $1 \times 10^{-9}$ to $5 \times 10^{-7}$ m obtained by a non-localized density functional theory method of 0.1 cm$^3$/g or more, desirably 0.2 cm$^3$/g or more, and having a plant containing at least one kind of component selected from the group consisting of sodium, magnesium, potassium and calcium as a raw material. Or a filter medium of Example 6 includes a porous carbon material having a value of a specific surface area by the nitrogen BET method of $1 \times 10^2$ m$^2$/g or more, having at least one peak in the range of 3 nm to 20 nm, in a pore diameter distribution obtained by a non-localized density functional theory method, in which a ratio of a total of volumes of fine pores having pore diameters in the range of 3 nm to 20 nm, with respect to a sum total of volumes of all fine pores, is 0.1 or more, and having a plant containing at least one kind of component selected from the group consisting of sodium, magnesium, potassium and calcium as a raw material. Alternatively, a filter medium of Example 6 includes a porous carbon material having a value of a specific surface area by the nitrogen BET method of $1 \times 10^2$ m$^2$/g or more, a volume of fine pores by mercury porosimetry of 1.0 cm$^3$/g or more, and having a plant containing at least one kind of component selected from the group consisting of sodium, magnesium, potassium and calcium as a raw material.

In Example 6, a porous carbon material includes a plant containing at least one kind of component selected from the group consisting of sodium (Na), magnesium (Mg), potassium (K) and calcium (Ca) as a raw material. When a filter medium obtained from such a plant raw material is used, since an abundant amount of mineral components is eluted from the porous carbon material into filtrate water, water hardness can be controlled. In this case, when 1 g of a filter medium is added in 50 mL of water (water for test) having the hardness of 0.1 or less and is allowed to stand for 6 hours, the hardness becomes 5 or more.

More specifically, in Example 6, skins of citrus fruits such as a mandarin orange skin (Example 6A), an orange skin (Example 6B), and a grape fruit skin (Example 6C), and a skin of a banana (Example 6D) were used as a raw material. Further, Kuraray Coal GW manufactured by Kuraray Chemical Co., Ltd. was used as Comparative Example 6.

When a porous carbon material making up a filter medium of Example 6 was manufactured, the various kinds of plant raw materials were dried at 120° C. for 24 hours. Thereafter, a pre-carbonizing treatment was conducted at 500° C. in a nitrogen gas flow for 3 hours. Then, after heating at 800° C. for 1 hour, the products were cooled to room temperature and pulverized with a mortar. Thus-obtained specimens (carbonaceous material, porous carbon material precursor) are referred to as specimens of Example 6a, Example 6b, Example 6c and Example 6d, for convenience. Thereafter, the respective specimens were dipped in concentrated hydrochloric acid for 24 hours, followed by washing until a wash solution became neutral. Thus, specimens of Example 6a', Example 6b', Example 6c' and Example 6d' were obtained. Next, by activating the specimens of Example 6a', Example 6b', Example 6c' and Example 6d' at 900° C. in water vapor flow for 1 hour, filter media including porous carbon materials of Example 6A, Example 6B, Example 6C and Example 6D could be obtained.

Figure 9:
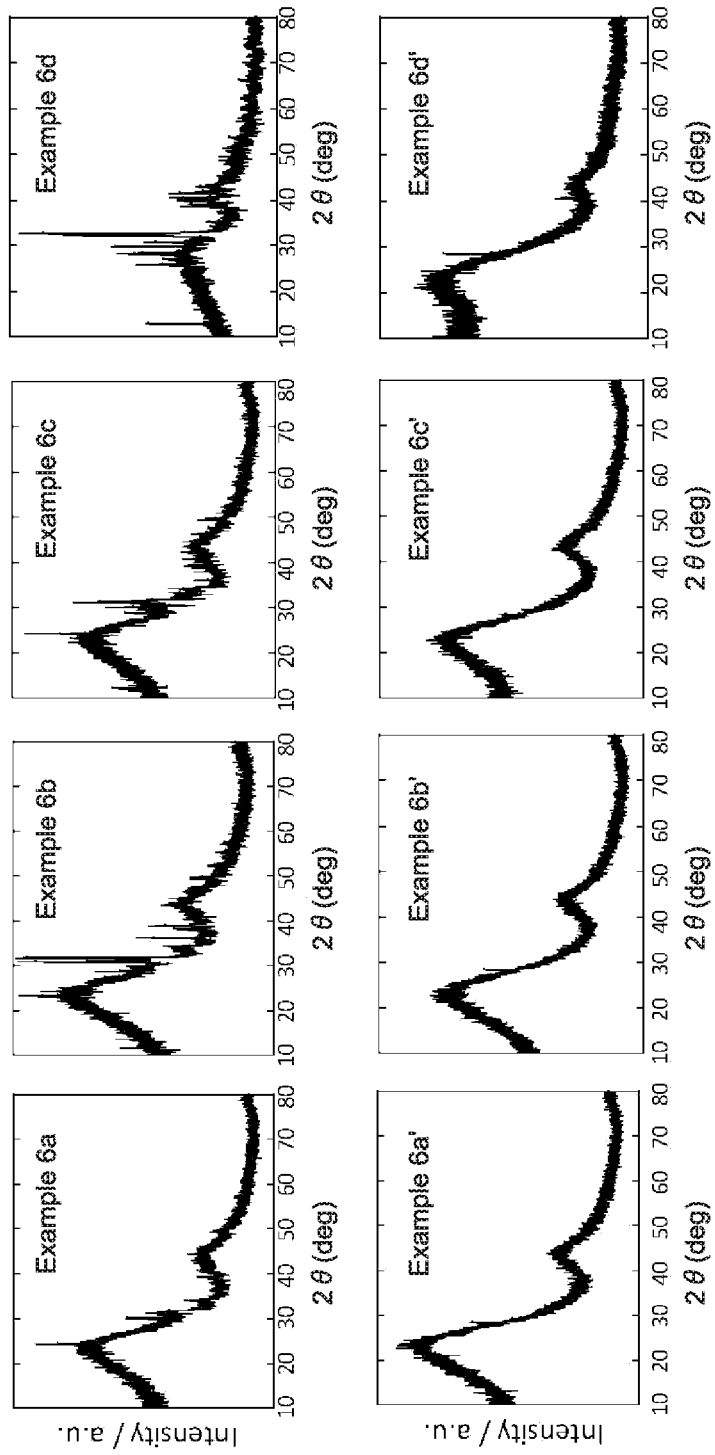
FIG. 9 are graphs each showing a result of X-ray diffractometry of each of specimens of Example 6a, Example 6a', Example 6b, Example 6b', Example 6c, Example 6c', Example 6d and Example 6d'.
Figure 10:
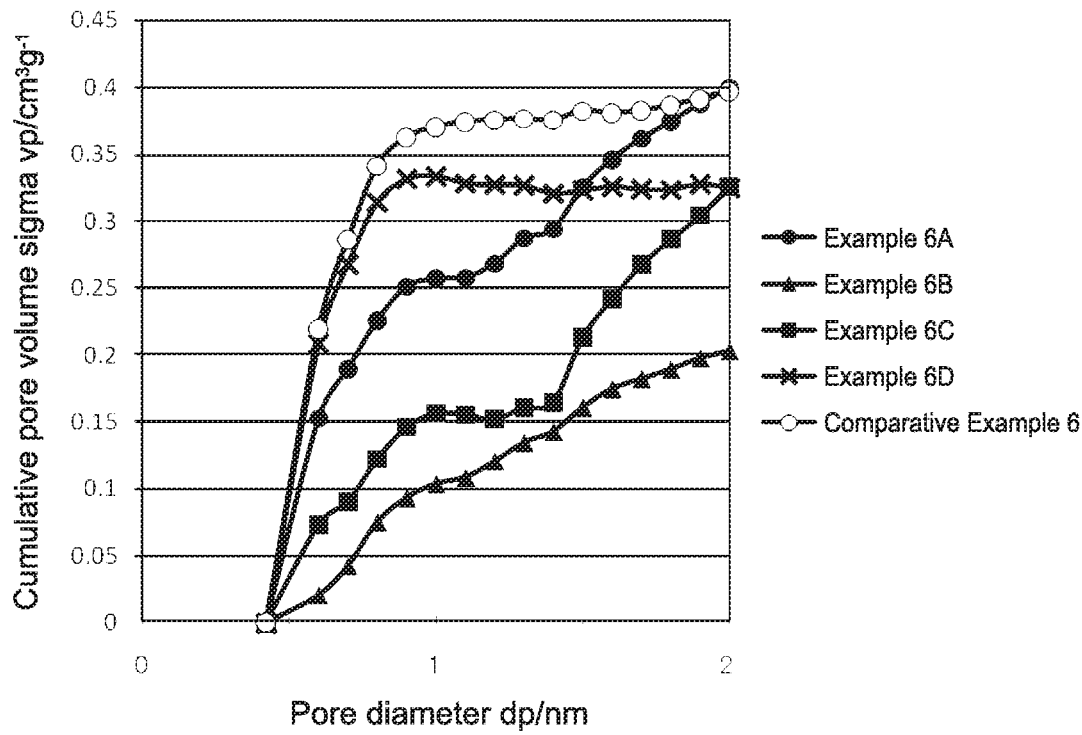
FIGS. 10 (A) and (B) of FIG. 10 are graphs each showing measurement results of fine pore volume of filter media of Example 6A, Example 6B, Example 6C and Example 6D and a filter medium of Comparative Example 6.
Figure 10:
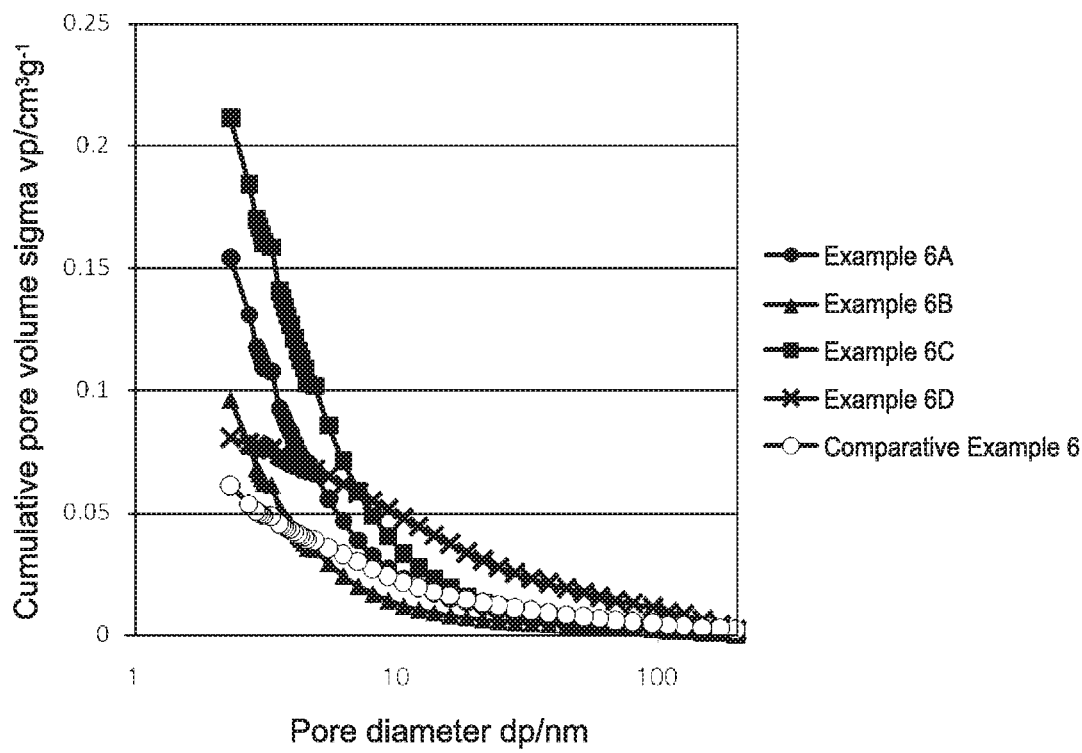
Figure 11:
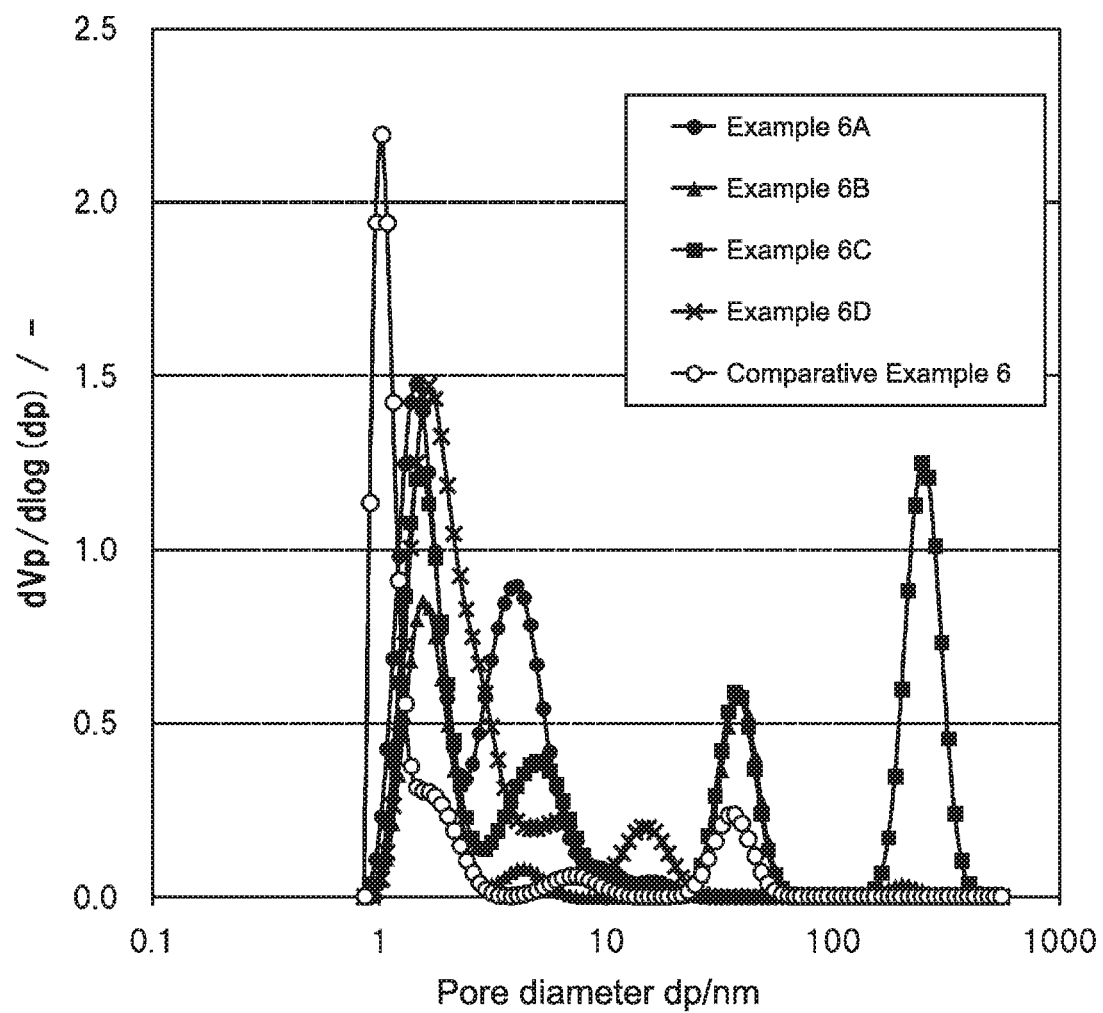
FIG. 11 is a graph showing measurement results of pore diameter distribution obtained by a non-localized density functional method of filter media of Example 6A, Example 6B, Example 6C and Example 6D, and Comparative Example 6.

Composition analysis results of specimens of Example 6A, Example 6B, Example 6C and Example 6D and of a specimen of Comparative Example 6 are shown in Table 4 below. Further, results of X-ray diffractometry of specimens of Example 6a, Example 6b, Example 6c and Example 6d and porous carbon materials of Example 6a', Example 6b', Example 6c' and Example 6d' are shown in (A) to (D) of FIG. 9. Filter media of Example 6A, Example 6B, Example 6C and Example 6D all were 200 mesh pass products. Further, when a specific surface area and a pore volume were measured, results shown in Table 1 and (A) and (B) of FIG. 10 were obtained. Further, volume ratios of a total of volumes of fine pores having a pore diameter in the range of 3 nm to 20 nm with respect to a total of volumes of fine pores having a diameter of $1 \times 10^{-9}$ to $5 \times 10^{-7}$ m (volume A, sum total of volumes of all fine pores) based on the NLDFT method are shown in Table 2. Further, a graph showing measurement results of pore diameter distribution obtained by the non-localized density functional theory method of filter media of Example 6A, Example 6B, Example 6C and Example 6D, and Comparative Example 6 is shown in FIG. 11.

From Table 4, it was found that specimens of Example 6A, Example 6B, Example 6C and Example 6D contain mineral components more abundant than a specimen of Comparative Example 6. Further, from results of X-ray diffractometry, crystalline peaks derived from the mineral components that were found in specimens of Example 6a, Example 6b, Example 6c and Example 6d were not observed from filter media of Example 6a', Example 6b', Example 6c' and Example 6d'. From this, it is considered that although a mineral content is partially removed once by acid treatment with concentrated hydrochloric acid, by an activation treatment, a mineral content inside the filter medium becomes prominent again.

Each of specimens of Example 6A, Example 6B, Example 6C and Example 6D and a specimen of Comparative Example 6 was added at a rate of 1 g/50 mL to test water (hardness: <0.066) that is pure water, and after stirring for 6 hours, the resulting solution was filtrated, and amounts of various kinds of minerals contained in the obtained filtrate were quantified by ICP-AES. In Table 5, mineral amounts in filtrates obtained from each of specimens and hardness of the filtrates are shown. Here, the hardness (mg/L) was calculated as that calcium concentration (mg/L)×2.5+magnesium concentration (mg/L)×4.1. For reference, also classification of water according to standard of World Health Organization (WHO) (soft water: 0 or more and less than 60, medium-level soft water (medium hard water): 60 or more and less than 120, hard water: 120 or more and less than 180, very hard water: 180 or more) is shown.

From Table 5, in each of specimens of Example 6, mineral eluting characteristics higher than that of Comparative Example 6 could be confirmed, and it was shown that porous carbon materials of Example 6 are suitable for controlling the hardness of a filtrate. Further, it was found that, depending on plant raw materials used, the hardness of the filtrate could be controlled to soft water, to medium hard water, to hard water, and to very hard water.

TABLE 1

|  | Specific surface area | Volume of total pores | MP method | BJH method | Mass |
|---|---|---|---|---|---|
| Example 1A | 1753 | 1.65 | 0.66 | 1.19 |  |
| Example 1B | 2056 | 1.83 | 0.73 | 1.37 |  |
| Reference Example 1 | 1804 | 1.64 | 0.67 | 1.27 |  |
| Comparative Example 1A | 1015 | 1.04 | 0.80 | 1.12 |  |
| Comparative Example 1B | 375 | 0.21 | 0.16 | 0.07 |  |
| Comparative Example 1C | 848 | 0.43 | 0.40 | 0.08 |  |
| Comparative Example 1D | 1109 | 0.62 | 0.49 | 0.21 |  |
| Example 2 | 1612 | 1.51 | 0.51 | 1.13 | 0.16 |
| Comparative Example 2A | 1099 | 0.57 | 0.50 | 0.14 | 1.00 |
| Comparative Example 2B | 908 | 0.48 | 0.42 | 0.12 | 0.85 |
| Comparative Example 2C | 1090 | 0.54 | 0.50 | 0.18 | 1.00 |
| Example 4 | 1321 | 1.13 | 0.70 | 0.56 |  |
| Example 6A | 802 | 0.434 | 0.40 | 0.15 |  |
| Example 6B | 372 | 0.223 | 0.20 | 0.96 |  |
| Example 6C | 605 | 0.402 | 0.33 | 0.21 |  |
| Example 6D | 843 | 0.396 | 0.33 | 0.080 |  |
| Comparative Example 6 | 929 | 0.414 | 0.40 | 0.061 |  |

TABLE 2

|  | Volume ratio | Sum total of volumes of all fine pores (Volume A) |
|---|---|---|
| Example 1A | 0.5354 | 2.0168 cm$^3$/g |
| Example 1B | 0.4820 | 2.2389 cm$^3$/g |
| Reference Example 1 | 0.4774 | 2.0595 cm$^3$/g |
| Comparative Example 1A | 0.2755 | 1.8993 cm$^3$/g |
| Comparative Example 1B | 0.0951 | 0.3228 cm$^3$/g |
| Comparative Example 1C | 0.0526 | 0.7105 cm$^3$/g |
| Comparative Example 1D | 0.1125 | 0.8427 cm$^3$/g |
| Example 2 | 0.5036 | 1.8934 cm$^3$/g |
| Comparative Example 2A | 0.1170 | 0.8836 cm$^3$/g |
| Comparative Example 2B | 0.0818 | 0.7869 cm$^3$/g |
| Comparative Example 2C | 0.0300 | 0.8765 cm$^3$/g |
| Example 4 | 0.4661 | 1.4396 cm$^3$/g |
| Reference Example 4 | 0.1340 | 0.7557 cm$^3$/g |
| Example 6A | 0.4006 | 0.5567 cm$^3$/g |
| Example 6B | 0.0553 | 0.3038 cm$^3$/g |
| Example 6C | 0.1566 | 0.7171 cm$^3$/g |
| Example 6D | 0.2597 | 0.5044 cm$^3$/g |
| Comparative Example 6 | 0.0216 | 0.6935 cm$^3$/g |

TABLE 3

| Particle size | mm | 0.075-0.25 | 0.25-0.50 | 0.50-0.85 | 0.85-1.7 |
|---|---|---|---|---|---|
| Example 2A | % | 0 | 54 | 46 | 0 |
| Example 2B | % | 0 | 0 | 67 | 33 |
| Comparative Example 2A | % | 0 | 2 | 83 | 15 |
| Comparative Example 2B | % | 0 | 0 | 38 | 62 |
| Comparative Example 2C | % | 0 | 61 | 39 | 0 |
| Example 7 | % | 19 | 45 | 33 | 3 |
| Comparative Example 7 | % | 20 | 80 | 0 | 0 |

TABLE 4

| Element | Example 6A | Example 6B | Example 6C | Example 6D | Comparative Example 6 |
|---|---|---|---|---|---|
| C | 88.54 | 89.89 | 84.70 | 82.79 | 90.09 |
| Na | 0.00 | 0.04 | 0.03 | 0.12 | — |
| Mg | 0.02 | 0.09 | 0.01 | 0.31 | 0.02 |
| K | 0.15 | 0.21 | 0.00 | 0.23 | 0.01 |
| Ca | 0.43 | 0.32 | 0.38 | 0.00 | 0.01 |
| Others | 10.86 | 9.45 | 14.88 | 16.55 | 9.87 |

TABLE 5

| Element | Example 6A | Example 6B | Example 6C | Example 6D | Comparative Example 6 | Test water |
|---|---|---|---|---|---|---|
| Na | 3.7 | 3.2 | 3.2 | 2.9 | 2.9 | 0.95 |
| Mg | 6.9 | 21 | 33 | 17 | 0.43 | <0.01 |

TABLE 5-continued

| | Example | | | | Comparative Example | Test |
|---|---|---|---|---|---|---|
| Element | 6A | 6B | 6C | 6D | 6 | water |
| K | 77 | 76 | 48 | 48 | 2.3 | <0.01 |
| Ca | 5.2 | 18 | 34 | 0.88 | 0.56 | <0.01 |
| Hardness | 41.29 | 131.1 | 220.3 | 71.9 | 3.16 | <0.066 |
| Classification | Soft water | Hard water | Very hard water | Medium hard water | Soft water | Soft water |

Example 7

Example 7 relates to filter media according to the ninth embodiment to fifteenth embodiment of the present disclosure. Example 7 intends to remove dodecylbenzene sulfonate (specifically, straight chain sodium dodecylbenzene sulfonate) of a synthetic detergent component that is abundantly discharged in a water environment, an agricultural germicide chlorothalonil (TPN, $C_8Cl_4N$) and a pesticide dichlorvos (DDVP, $C_4H_7C_{12}O_4P$), which are abundantly used, soluble lead eluted from water pipes and the like, free residual chlorine that is a typical contaminant in tap water, and various organic halogen compounds by produced during disinfection by chlorine (including organic halogen compounds generated from a humic substance).

In Example 7, a porous carbon material was manufactured according to the following method. Further, as Comparative Example 7, Kuraray Coal GW was used.

In the manufacture of a porous carbon material in Example 7, after a plant-derived material was carbonized at 400° C. to 1400° C., by treating with an alkali, a porous carbon material was obtained. That is, firstly, rice husks were heated (preliminary carbonizing treatment) in an inert gas flow. Specifically, by heating rice husks in a nitrogen gas flow at 500° C. for 5 hours to carbonize, a carbide was obtained. When such a treatment is conducted, a tar component to be generated in the following carbonization can be reduced or removed. Thereafter, 10 g of the carbide was charged in an alumina crucible and heated up to 800° C. at a rate of temperature increase of 5° C./min in a nitrogen gas flow (10 L/min). Then, after carbonizing at 800° C. for 1 hour to convert to a carbonaceous substance (porous carbon material precursor), the carbonaceous substance was cooled to room temperature. During carbonizing and cooling, a nitrogen gas was continued to flow. Next, the porous carbon material precursor was treated at 80° C. with an alkali by dipping in an aqueous solution of 10% by mass of sodium hydroxide overnight, and, after that, the resultant was washed using water and ethyl alcohol until pH7 was obtained. Then, after drying at 120° C., by activating by heating at 900° C. for 3 hours in a water vapor flow (2.5 L/min), a porous carbon material of Example 7 was obtained.

Results of measurements of particle size distributions of specimens of Example 7 and Comparative Example 7 are shown in Table 3. Further, results of measurement of specific surface areas and pore volumes of specimens of Example 7 and Comparative Example 7 are shown in the following Tables 6 and 7. Measurement items and units in Tables 6 and 7 are the same as those in Tables 1 and 2. Further, measurement results by mercury porosimetry are shown in Table 8.

TABLE 6

| | Specific surface area | Volume of all fine pores | MP method | BJH method | Mass |
|---|---|---|---|---|---|
| Example 7 | 1280 | 0.93 | 0.44 | 0.52 | 0.30 |
| Comparative Example 7 | 820 | 0.41 | 0.39 | 0.08 | 1.15 |

TABLE 7

| | Volume ratio | Sum total of volumes of all fine pores (volume A) |
|---|---|---|
| Example 7 | 0.3723 | 1.2534 cm³/g |
| Comparative Example 7 | 0.0219 | 0.6935 cm³/g |

TABLE 8

| | |
|---|---|
| Example 7 | 1.94 cm³/g |
| Comparative Example 7 | 0.26 cm³/g |

From each of specimens of Example 7 and Comparative Example 7, 2 cm³ thereof was sampled and housed in a column with a stainless net. Then, a solution in which
(A) 0.9 mg of sodium dodecylbenzene sulfonate,
(B) 6.0 μg of chlorothalonil,
(C) 6.0 μg of dichlorvos,
(D) 6 μg (in terms of lead) of soluble lead (specifically, lead acetate),
(E) 0.2 mg (in terms of chlorine) of sodium hypochlorite as free chlorine, and
(F) 130±20 μg by TOX concentration of total organic halogens (in terms of chlorine) respectively were dissolved in 1 L of water was prepared, and, the solution was flowed past through 2 cm³ of each of specimens at a flow rate of 40 mL/min. After that, concentrations thereof before and after water passing were measured, and the removal rates were calculated. A flow rate of 40 mL/min corresponds to the following spatial velocity (SV).

Further, a solution in which
(A) 0.9 mg of sodium dodecylbenzene sulfonate,
(B) 6.0 μg of chlorothalonil, and
(E) 0.2 mg (in terms of chlorine) of sodium hypochlorite as free chlorine, were each dissolved in 1 L of water was prepared, and, the solution was flowed past through 2 cm³ of each of specimens at a flow rate of 240 mL/min. After that, concentrations thereof before and after water passing were measured, and the removal rates were calculated. A flow rate of 240 mL/min corresponds to the following spatial velocity (SV).

Flow rate of 40 mL/min:

SV=40×60 (mL/hr)/2 cm³=1200 hr⁻¹

Flow rate of 240 mL/min:

SV=240×60 (mL/hr)/2 cm³=7200 hr⁻¹

Next, the removal rate of sodium dodecylbenzene sulfonate was measured based on cell-atomic absorption spectrometry, the removal rates of chlorothalonil and dichlorvos were measured based on gas chromatography with an electron capture detector (ECO-GC), the removal rate of soluble lead was measured based on inductively-coupled plasma mass spectrometry (ICP/MS), the removal rate of free chlorine was measured based on cell-atomic absorption spectrometry, and the removal rate of total organic halogens was measured based on ion chromatography.

Figure 12:
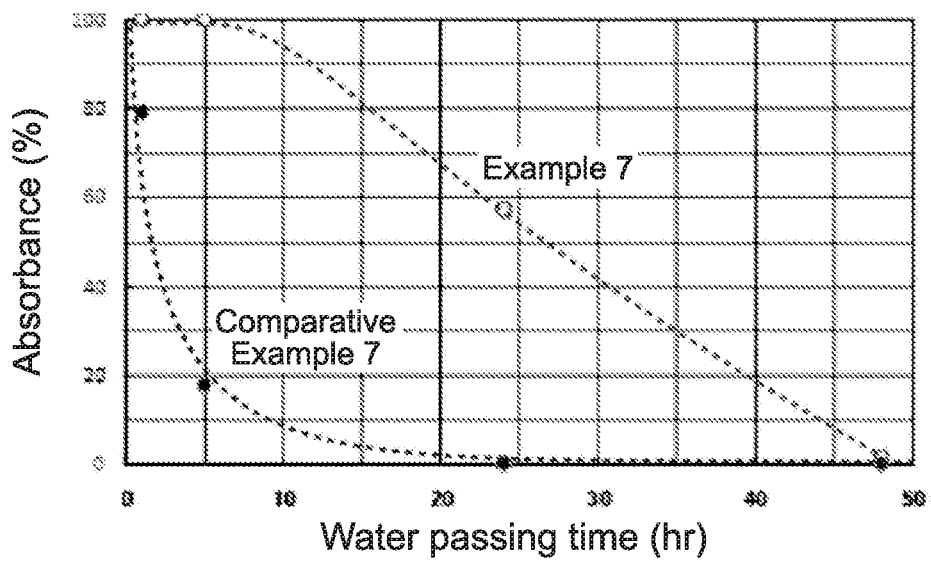
FIGS. 12 (A) and (B) of FIG. 12 are graphs each showing measurement results of removal rate of sodium dodecylbenzene sulfonate of specimens of Example 7 and Comparative Example 7.
Figure 12:
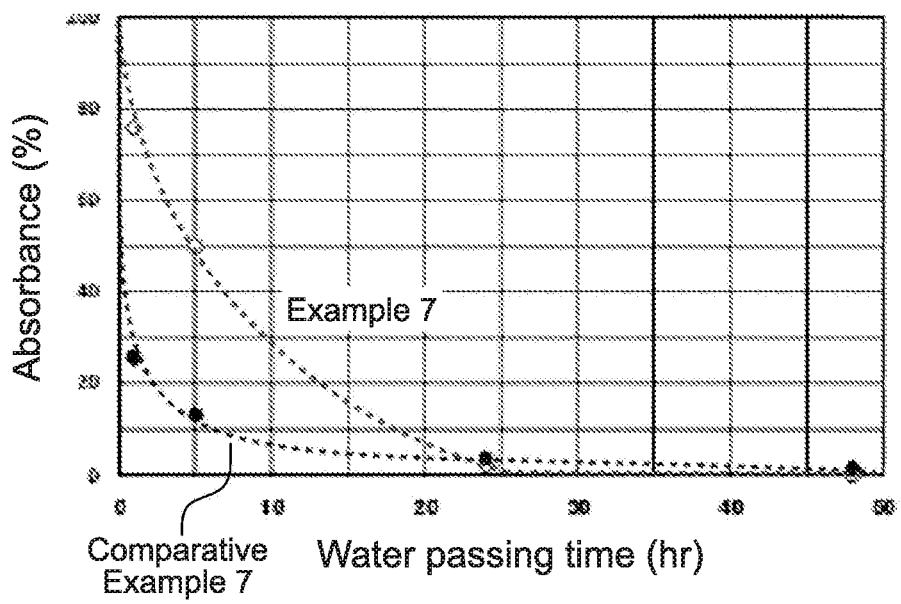
Figure 13:
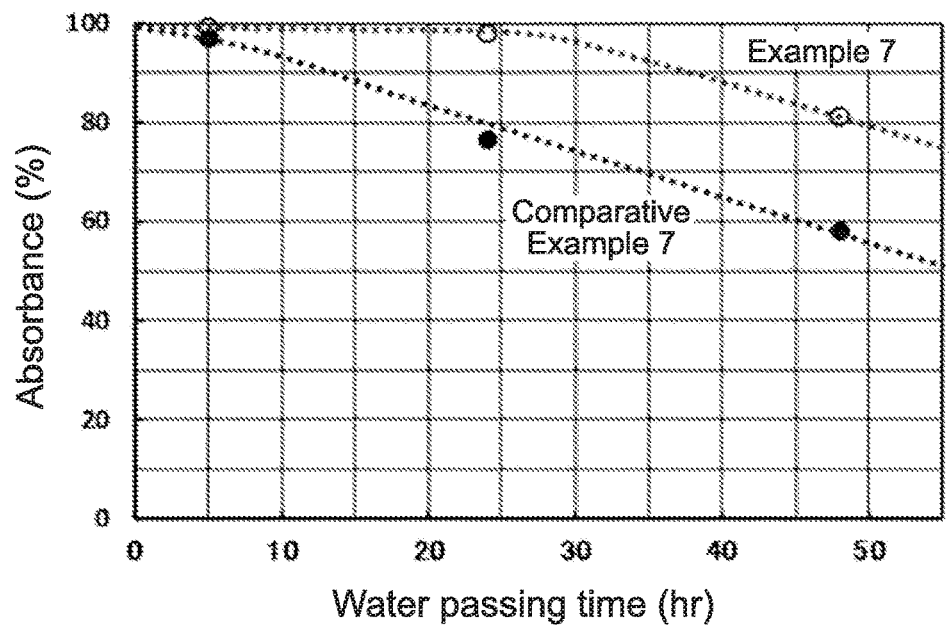
FIGS. 13 (A) and (B) of FIG. 13 are graphs each showing measurement results of removal rate of chlorothalonil of specimens of Example 7 and Comparative Example 7.
Figure 13:
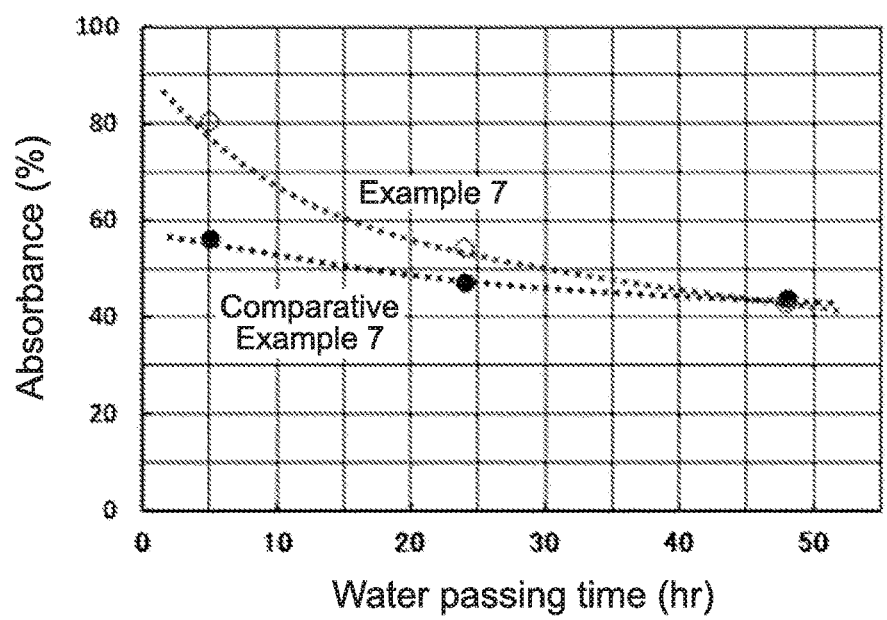
Figure 14:
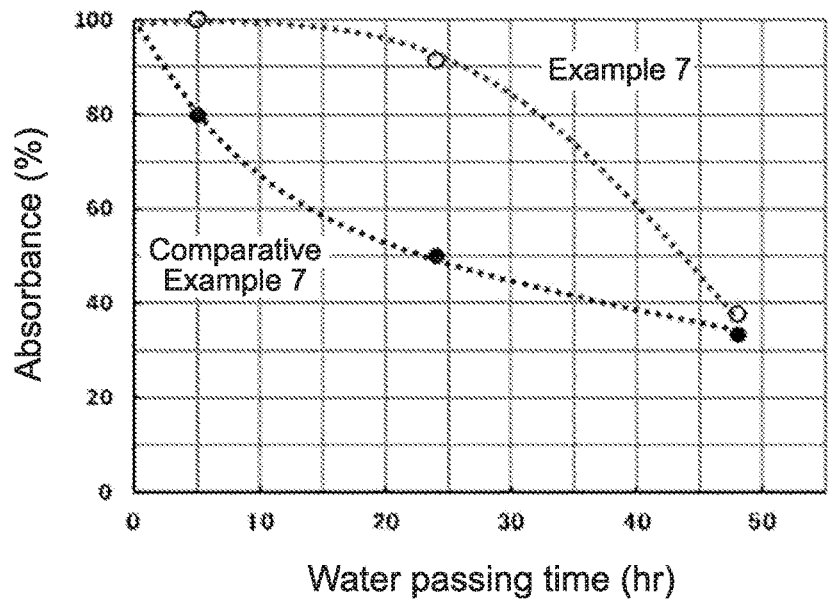
FIG. 14 is a graph showing measurement results of removal rate of dichlorvos of specimens of Example 7 and Comparative Example 7.
Figure 15:
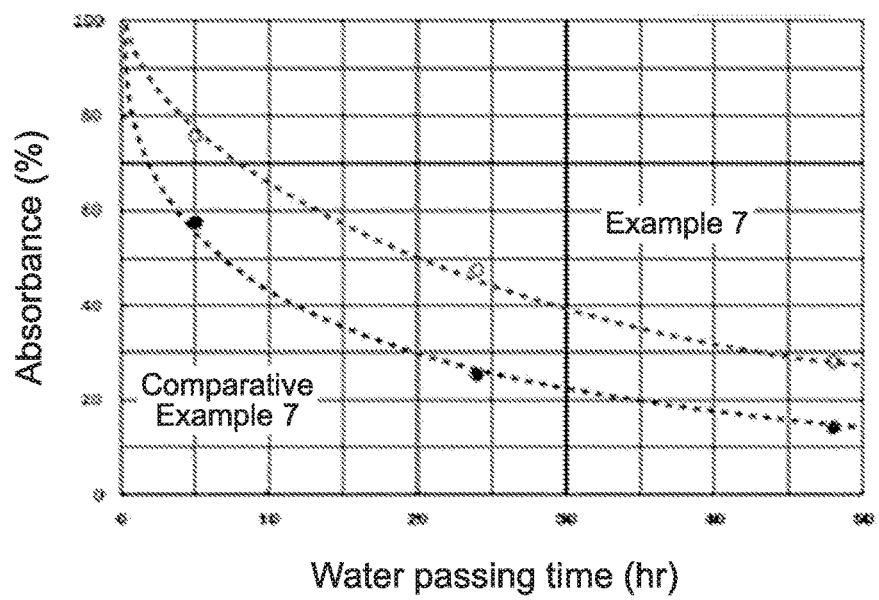
FIG. 15 is a graph showing measurement results of removal rate of soluble lead of specimens of Example 7 and Comparative Example 7.
Figure 16:
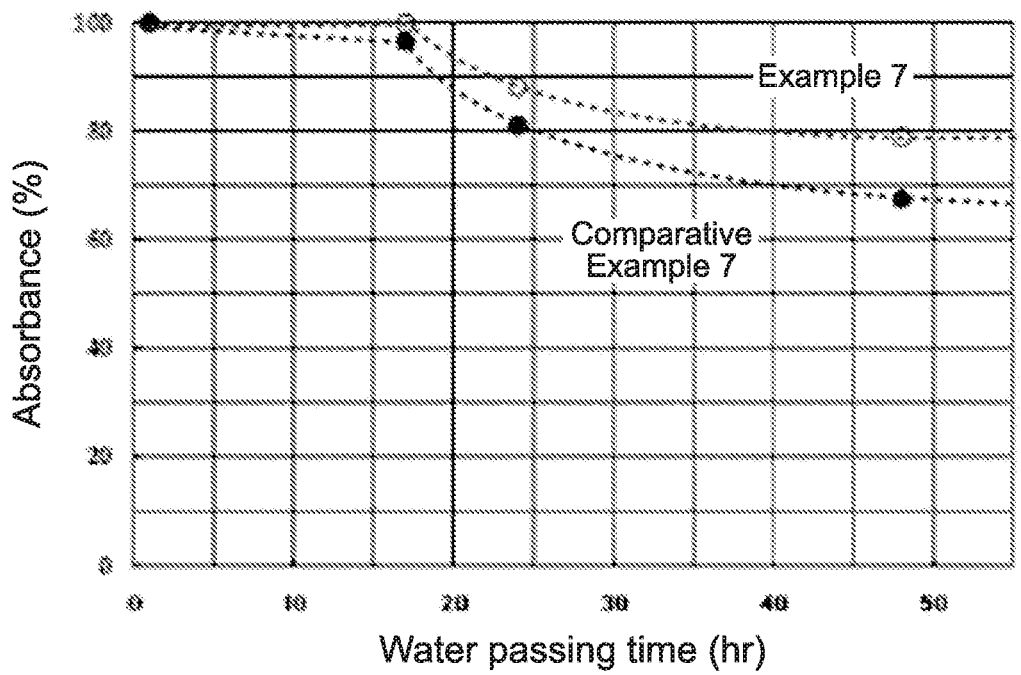
FIGS. 16 (A) and (B) of FIG. 16 are graphs each showing measurement results of removal rate of free chlorine of specimens of Example 7 and Comparative Example 7.
Figure 16:
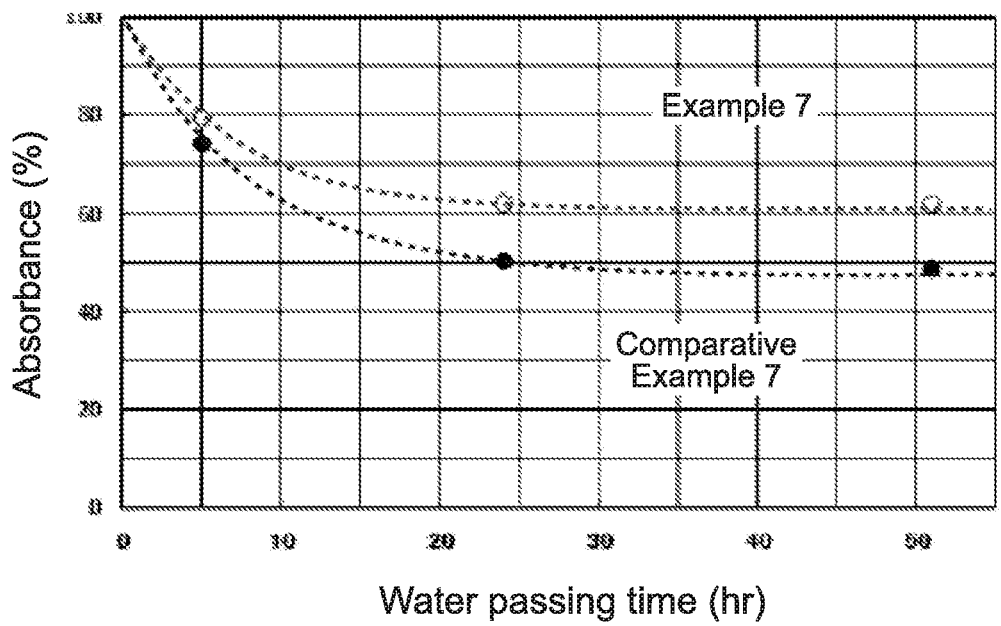
Figure 17:
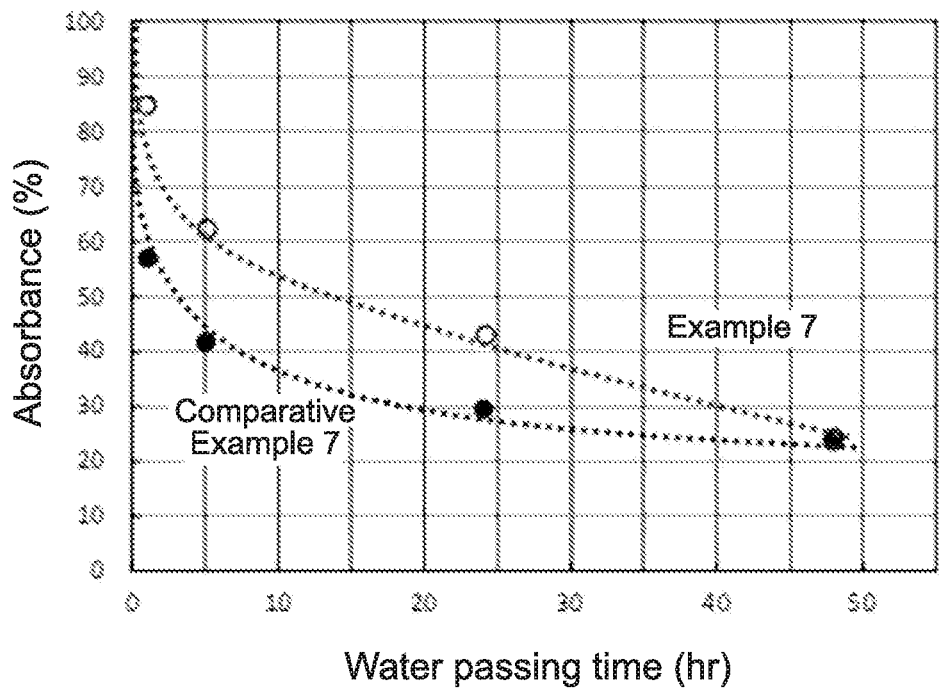
FIG. 17 is a graph showing measurement results of removal rate of total organic halogens of specimens of Example 7 and Comparative Example 7.

Measurement results of removal rate of sodium dodecylbenzene sulfonate (DBS) are shown in (A) and (B) of FIG. 12, measurement results of removal rate of chlorothalonil (TPN) are shown in (A) and (B) of FIG. 13, measurement results of removal rate of dichlorvos (DDVP) are shown in FIG. 14, measurement results of removal rate of soluble lead are shown in FIG. 15, measurement results of removal rate of free chlorine are shown in (A) and (B) of FIG. 16, and measurement results of removal rate of total organic halogens are shown in FIG. 17. In all of these, Example 7 showed the removal rates higher than those of Comparative Example 7.

That is, in a filter medium of Example 7, when water containing 1 μg/L of a substance having a molecular weight of $1\times10^2$ to $1\times10^5$ was continuously flowed at the spatial velocity of 1200 $hr^{-1}$ for 48 hours, the time taken until the removal rate of the substance reached 80% was twice or more longer than the time taken until the removal rate of the substance reached 80% when a coconut shell activated carbon was used.

Further, in a filter medium of Example 7, when water containing 0.9 mg/L of dodecylbenzene sulfonate was continuously flowed at the spatial velocity of 1200 $hr^{-1}$ for 25 hours, the removal rate of dodecylbenzene sulfonate was 10% or more.

Still further, in a filter medium of Example 7, when water containing 6 μg/L of chlorothalonil was continuously flowed at the spatial velocity of 1200 $hr^{-1}$ for 50 hours, the removal rate of chlorothalonil was 60% or more.

Further, in a filter medium of Example 7, when water containing 6 μg/L of dichlorvos was continuously flowed at the spatial velocity of 1200 $hr^{-1}$ for 25 hours, the removal rate of dichlorvos was 60% or more.

Still further, in a filter medium of Example 7, when water containing 6 μg/L of soluble lead was continuously flowed at the spatial velocity of 1200 $hr^{-1}$ for 25 hours, the removal rate of soluble lead was 30% or more.

Further, in a filter medium of Example 7, when water containing 0.2 mg/L of free chlorine was continuously flowed at the spatial velocity of 1200 $hr^{-1}$ for 50 hours, the removal rate of free chlorine was 70% or more.

Still further, in a filter medium of Example 7, when water containing 130 μg/L in terms of chlorine of total organic halogens was continuously flowed at the spatial velocity of 1200 $hr^{-1}$ for 5 hours, the removal rate of total organic halogens was 45% or more.

From the measurement results of the removal rate of sodium dodecylbenzene sulfonate (DBS), it was found that the filter medium of Example 7, in spite of the packing rate of only about 27% compared with that of the activated carbon of Comparative Example 7, maintained the removal rate higher than that of the activated carbon of Comparative Example 7, that is, at about 5 hours of water passing time, the removal rate was 100%, and, at about 27 hours of water passing time, the removal rate was 50% or more, at the SV=1200 $hr^{-1}$. On the other hand, in the activated carbon of Comparative Example 7, immediate after water passing, the removal rate rapidly decreased. This is considered that it is because with the activated carbon of Comparative Example 7, which has only small fine pores, adsorption rate of DBS that has a large molecular weight is low. From results of tests, in Example 7, by using a stationary water cleaner (hereinafter, referred to as "stationary water cleaner-A" for convenience) that contains 150 mL of a filter medium of Example 7, when assumed that water containing 0.2 mg/L of DBS is filtered by 25 liters a day at the flow rate of 3.0 L/min, it was inferred that 100% of DBS can be removed, for about 18 months. Further, also at the SV=7200 $hr^{-1}$, the removal rate higher than that of Comparative Example 7 could be maintained. Then, when assumed that water containing 0.2 mg/L of DBS is filtered by 15 liters per day at the flow rate of 1.8 L/min, it was inferred that 50% or more of DBS can be removed, with the use of a stationary water cleaner (hereinafter, referred to as "stationary water cleaner-B" for convenience) that contains 15 mL of a filer medium of Example 7, for about 4 months.

From measurement results of removal rate of chlorothalonil (TPN), at the SV=1200 $hr^{-1}$, a filter medium of Example 7 maintained the removal rate of TPN higher than that of the activated carbon of Comparative Example 7, that is, the removal rate of the filter medium of Example 7 maintained the removal rate of 80% or more up to about 50 hours, which is about 2.05 times a value of the activated carbon of Comparative Example 7 at the water passing time of 20 hours. This is considered that since a molecular weight of TPN is as large as 265.9, a filter medium of Example 7 that has a larger adsorption speed is more advantageous than the activated carbon of Comparative Example 7. Further, since TPN has smaller solubility in water and higher adsorptivity, a high removal rate could be maintained for a long time. And, from results of tests, in Example 7, when assumed that water containing 6.0 μg/L of TPN is filtered by 25 L per day at the flow rate of 3.0 L/min by using the stationary water cleaner-A, it was inferred that 80% or more of TPN can be removed, for about 1 year. On the other hand, at the SV=7200 $hr^{-1}$, although the removal rate is lower than that in the case of the SV=1200 $hr^{-1}$, when assumed that water containing 6.0 μg/L of TPN is filtered by 15 L per day at the flow rate of 1.8 L/min, it was inferred that 50% or more of TPN can be removed, with the use of the stationary water cleaner-B, for about 7 months.

Further, from measurement results of removal rate of dichlorvos (DDVP), at the SV=1200 $hr^{-1}$, a filter medium of Example 7 maintained the removal rate higher than that of the activated carbon of Comparative Example 7, that is, the removal rate of the filter medium of Example 7 maintained the removal rate of 80% or more up to about 32 hours of water passing time. This is considered that since a molecular weight of DDVP is slightly large such as the molecular weight of 221, a filter medium of Example 7 that has a larger adsorption speed is more advantageous than the activated carbon of Comparative Example 7. Since DDVP has a very large solubility in water such as 10 g/L and an equilibrium adsorption amount is small, the removal rate up to 32 hours of water passing time was 80% or more. However, after that, at about 43 hours of the water passing time, the removal rate became 50%. About 32 hours of the water passing time corresponds to about 8 months use when assumed that water containing 6.0 μg/L of DDVP is filtered 25 liters per day at the flow rate of 3.0 L/min by using the stationary water cleaner-A, and about 43 hours of the water passing time corresponds to about 10 months use.

From measurement results of removal rate of soluble lead, at the SV=1200 $hr^{-1}$, a filter medium of Example 7 maintained the removal rate higher than that of the activated carbon of Comparative Example 7, and, the removal rate at about 22 hours of water passing time was 50% or more. The removal rate of the activated carbon of Comparative Example 7 was 50% or less at about 8 hours of the water passing time. This is considered to be showing that a filter medium of Example 7 has many active points that are liable to adsorb lead. And, from results of tests, when assumed that water containing 6 μg/L of soluble lead (in terms of lead) is filtered by 25 liters per day at the flow rate of 3.0 L/min by using the stationary water cleaner-A, it was inferred that 50% or more of lead can be removed, for about 5 months.

From measurement results of removal rate of free chlorine, at the SV=1200 hr$^{-1}$, a filter medium of Example 7 maintained the removal rate higher than that of Comparative Example 7, and, the removal rate even after about 48 hours of water passing time was about 80%. Since the free chlorine is removed by a reduction reaction on a surface of the filter medium, it is inferred that a filter medium of Example 7 has not only a large intraparticle diffusion speed but also many active points that are liable to reduce free chlorine on a surface. And, from results of tests, when assumed that water containing 0.2 mg/L of free chlorine (in terms of chlorine) is filtered by 25 liters per day at the flow rate of 3.0 L/min by using the stationary water cleaner-A, it was inferred that 80% or more of free chlorine can be removed, for about 1 year. On the other hand, even at the SV=7200 hr$^{-1}$, the removal rate after 48 hours of water passing time is about 60%. And, from results of tests, when assuming that water containing 2.0 mg/L of free chlorine (in terms of chlorine) is filtered by 15 liters per day at the flow rate of 1.8 L/min by using the stationary water cleaner-B, it was inferred that 60% or more of free chlorine can be removed, for about 1 year.

From measurement results of removal rate of total organic halogens (including organic halogen compounds generated from a humic substance), at the SV=1200 hr$^{-1}$, a filter medium of Example 7 maintained the removal rate higher than that of the activated carbon of Comparative Example 7 up to 48 hours of the water passing time. Since, among the TOX components, a substance having a slightly larger molecular weight is contained, it is considered that a filter medium of Example 7, which has a larger adsorption speed, has the removal rate larger than that of the activated carbon of Comparative Example 7. And, from results of tests, when assuming that water containing 130 μg/L (in terms of chlorine) of total organic halogens (TOX) is filtered by 25 liters per day at the flow rate of 3.0 L/min by using the stationary water cleaner-A, it was inferred that 50% or more can be removed, for about 4 months.

Example 8

Example 8 is a modification of Example 1 to Example 7. In Example 8, as a schematic partial sectional view is shown in (A) of FIG. 18, each of filter media described in Examples 1 to 7 was assembled in a bottle (so-called PET bottle) 20 with a cap member 30. Specifically, inside the cap member 30, a filter medium 40 of any of Examples 1 to 7 was disposed and filters 31 and 32 were disposed on a liquid inlet side and a liquid outlet side of the cap member 30 to prevent the filter medium 40 from eluting off. Then, when a liquid or water (drinkable water, a lotion, or the like) 21 in the bottle 20 is drunk or used by passing through the filter medium 40 disposed inside the cap member 30, for example, mineral components in the liquid (water) can be increased. The cap member 30 is usually closed with a cap (not shown).

Figure 18:
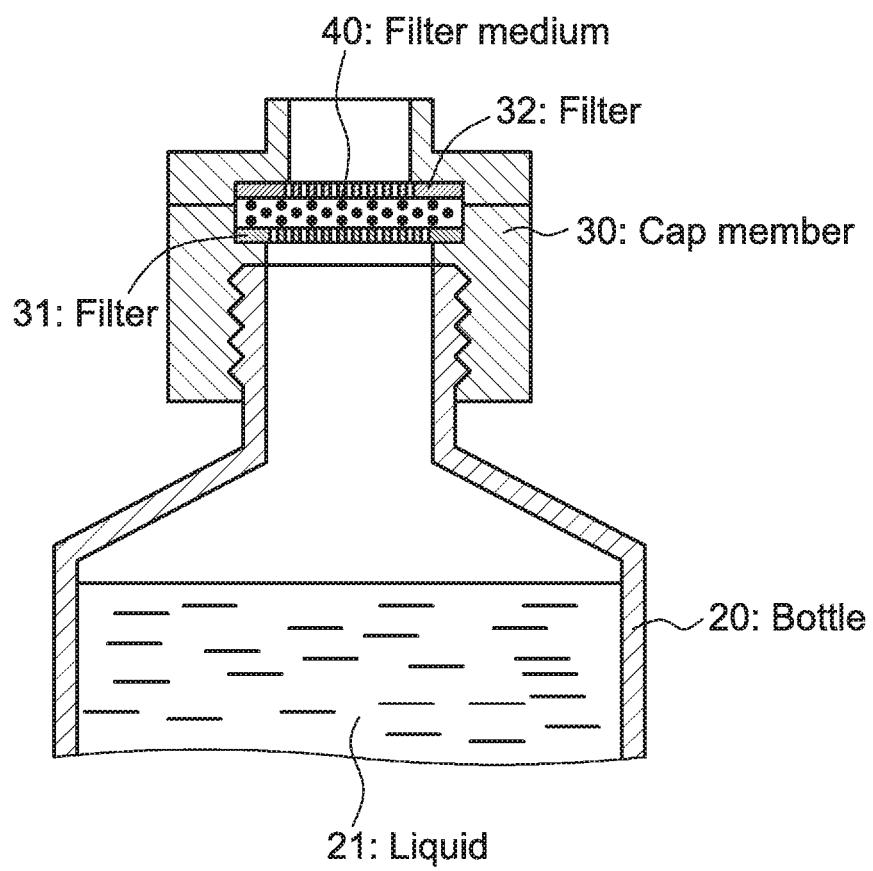
FIGS. 18 (A) and (B) of FIG. 18 are a schematic partial sectional view and a schematic sectional view of a bottle in Example 8.
Figure 18:
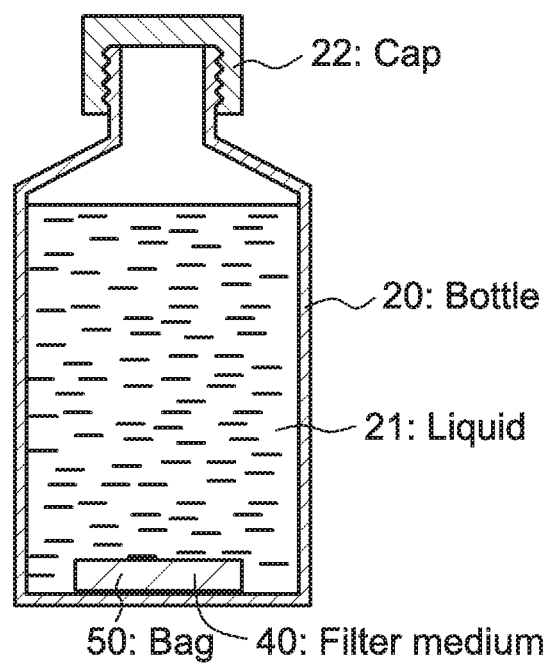
Figure 19:
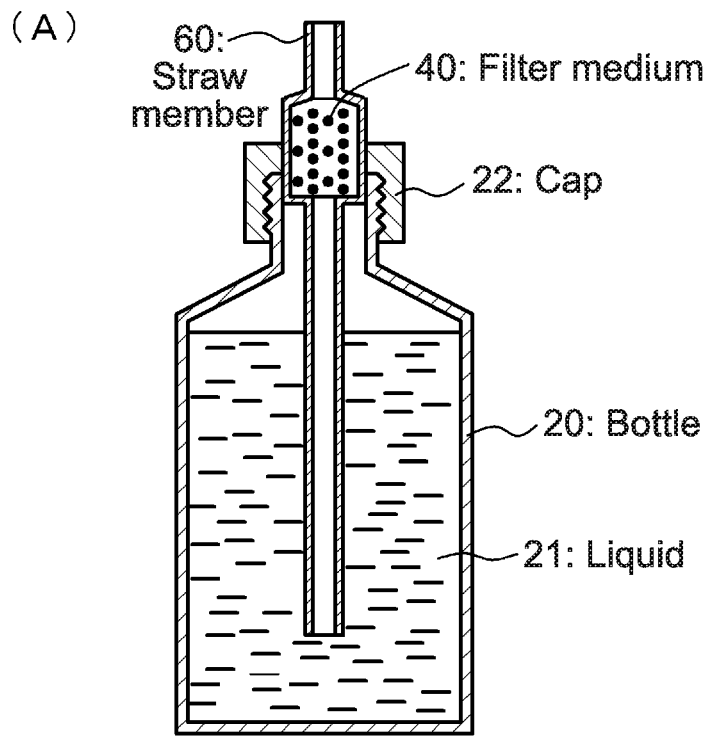
FIGS. 19 (A) and (B) of FIG. 19 are a schematic partial sectional view and a partially cutaway schematic view of a modified example of a bottle in Example 8.
Figure 19:
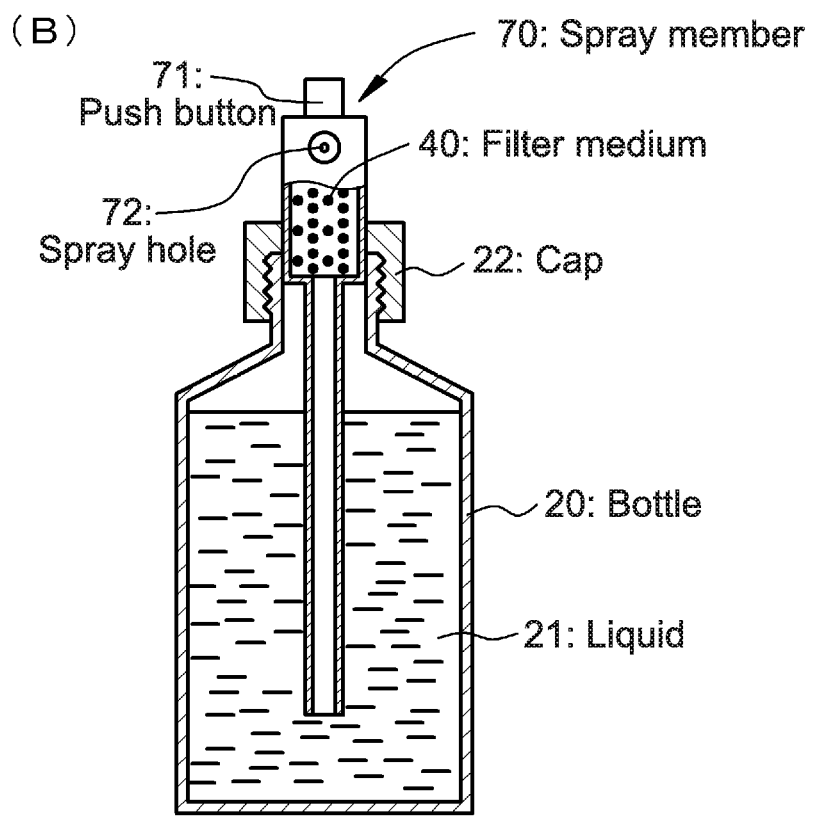

Or, as a schematic sectional view is shown in (B) of FIG. 18, a form in which a filter medium 40 of any of Examples 1 to 7 is housed in a permeable bag 50 and the bag 50 is put into a liquid or water (drinkable water, a lotion, or the like) 21 in a bottle 20 can be adopted. A reference numeral 22 denotes a cap for closing an opening of the bottle 20. Or, as a schematic sectional view is shown in (A) of FIG. 19, a filter medium 40 of any of Examples 1 to 7 is disposed inside a straw member 60 and a filter (not shown) is disposed on a liquid inlet side and a liquid outlet side of the straw member to prevent the filter medium 40 from flowing off. Then, when a liquid or water (drinkable water) 21 in the bottle 20 is drunk by passing through the filter medium 40 of Examples 1 to 7 disposed inside the straw member 60, mineral components in the liquid (water) can be increased. Or, as a partially cutaway schematic diagram is shown in (B) of FIG. 19, a filter medium 40 of any of Examples 1 to 7 is disposed inside a spray member 70 and a filter (not shown) is disposed on a liquid inlet side and a liquid outlet side of the spray member 70 to prevent the filter medium 40 from flowing off. Then, by pushing a push button 71 provided to the spray member 70 to allow a liquid or water (drinkable water, a lotion, or the like) 21 inside the bottle 20 to pass through the filter medium 40 of Examples 1 to 7 disposed inside the spray member 70 to spray from a spray hole 72, mineral components in the liquid (water) can be increased.

In the above, the present invention was described based on preferred examples. However, the present invention is not limited to these examples and can be variously modified. A water cleaner in which as a filter medium, a filter medium described in Example 1 and a ceramic filter medium (ceramic filter medium having fine pores) are combined, and a water cleaner in which a filter medium described in Example 1 and an ion exchange resin are combined, can be made. Further, a porous carbon material that makes up a filter medium of the present invention may be granulated to be used.

In Examples, a case where as a raw material of a porous carbon material, rice husks are used was described. However, other plant-derived raw materials may be used. Here, as other plants, for example, straws, reeds, or Wakame stems, vascular plants that live on land, ferns, bryophytes, algae, seaweeds and the like can be mentioned. These materials may be used singularly or in a combination of several kinds thereof. Specifically, by carbonizing, for example, rice straws (for example, the Isehikari produced in Kagoshima) as a plant-derived material, which is a raw material of a porous carbon material, into a carbonaceous substance (porous carbon material precursor), followed by performing an acid treatment, a porous carbon material can be obtained. Alternatively, by carbonizing rice reeds as a plant-derived material, which is a raw material of a porous carbon material, into a carbonaceous substance (porous carbon material precursor), followed by performing an acid treatment, a porous carbon material can be obtained. Further, also in a porous carbon material obtained by treating with, in place of an aqueous solution of hydrofluoric acid, an alkali (base) such as an aqueous solution of sodium hydroxide, the same result could be obtained.

Or, by carbonizing Wakame stems (produced in Sanriku in Iwate) as a plant-derived material, which is a raw material of a porous carbon material, into a carbonaceous substance (porous carbon material precursor), followed by performing an acid treatment, a porous carbon material can be obtained. Specifically, first, for example, Wakame stems are heated at a temperature of about 500° C. to carbonize. Before heating, for example, raw material Wakame stems may be treated with alcohol. As a specific processing method, a method of dipping in ethyl alcohol or the like can be mentioned, thereby, a water content contained in the raw material can be reduced and other elements other than carbon and mineral components, which are contained in a finally obtained porous carbon material, can be eluted. Further, by treating with alcohol, a gas can be suppressed from generating during carbonizing. More specifically, Wakame stems are dipped in ethyl alcohol for 48 hours. It is desirable to apply an ultrasonic treatment in ethyl alcohol. Then, by heating the Wakame stems at 500° C. for 5 hours in a nitrogen gas flow to carbonize, a carbide is obtained. By performing such a treatment (preliminary carbonizing treatment), a tar component that would be generated during the subsequent carbonizing process can be reduced or removed. Thereafter, 10 g of the carbide is charged in an alumina crucible and heated up to 1000° C. at a rate of temperature increase of 5° C./min in a nitrogen gas flow (10 L/min). Then, after carbonizing at 1000° C. for 5 hours to convert to a carbonaceous substance (porous carbon material precursor), the carbonaceous substance is cooled to room temperature. During carbonizing and cooling, a nitrogen gas is continued to flow. Next, the porous carbon material precursor is treated with an acid by dipping in an aqueous solution of 46% by volume of hydrofluoric acid overnight, and, after that, the resultant is washed using water and ethyl alcohol until pH7 is obtained. Then, by finally drying, a porous carbon material can be obtained.

DESCRIPTION OF REFERENCE NUMERALS 1 carbon/polymer composite
2 nonwoven fabric
10 water cleaner body
11 porous carbon material
12 first packing part
13 cotton
14 second packing part
15 inlet
16 outlet
20 bottle
21 liquid or water
22 cap
30 cap member
31, 32 filter
40 filter medium
50 bag
60 straw member
70 spray member
71 push button
72 spray hole

The invention claimed is:

1. A decontaminant comprising:
a porous carbon material having a value of a specific surface area based on a nitrogen BET method of $1\times10^2$ m$^2$/g or more, a volume of fine pores based on a BJH method of 0.3 cm$^3$/g or more, and a particle size distribution consisting of a first particle size range of 0.50 mm to 0.85 mm; and a second particle size range of 0.85 to 1.7 mm, wherein the first particle size range is at a greater particle size distribution percentage as compared to the second particle size range, and wherein the porous carbon material is made from a plant based material including siliconwherein the porous carbon material is made from a plant-derived material including one or more of a husk of a rice, a husk of a barley, a husk of a wheat, a husk of a rye, a husk of a Japanese millet, a husk of a foxtail millet, a straw of a rice, a straw of a barley, a straw of a wheat, a straw of a rye, a straw of a Japanese millet, a straw of a foxtail millet, a coffee bean, a tea leave, a green tea leave, a black tea leave, a sugar cane, a bagasse, a corn, a corn core, a fruit skin, a citrus fruit skin, a skin of a mandarin orange, a skin of a banana, a reed, a Wakame, a fern, a bryophytes, an algae and a seeweed.

2. A decontaminant comprising:
a porous carbon material having a value of a specific surface area based on a nitrogen BET method of $1\times10^2$ m$^2$/g or more, a total of volumes of fine pores having a diameter of from $1\times10^{-9}$ m to $5\times10^{-7}$ m, obtained by a non-localized density functional theory method, of 1.0 cm$^3$/g or more, and a particle size distribution consisting of a first particle size range of 0.50 mm to 0.85 mm; and a second particle size range of 0.85 to 1.7 mm, wherein the first particle size range is at a greater particle size distribution percentage as compared to the second particle size range, and wherein the porous carbon material is made from a plant-derived material including one or more of a husk of a rice, a husk of a barley, a husk of a wheat, a husk of a rye, a husk of a Japanese millet, a husk of a foxtail millet, a straw of a rice, a straw of a barley, a straw of a wheat, a straw of a rye, a straw of a Japanese millet, a straw of a foxtail millet, a coffee bean, a tea leave, a green tea leave, a black tea leave, a sugar cane, a bagasse, a corn, a corn core, a fruit skin, a citrus fruit skin, a skin of a mandarin orange, a skin of a banana, a reed, a Wakame, a fern, a bryophytes, an algae, and a seeweed.

3. A decontaminant comprising:
a porous carbon material having a value of a specific surface area based on a nitrogen BET method of $1\times10^2$ m$^2$/g or more, having at least one peak in the range of 3 nm to 20 nm, in a pore diameter distribution obtained by a non-localized density functional theory method, in which a ratio of a total of volumes of fine pores that have pore diameters in the range of 3 nm to 20 nm, with respect to a sum total of volumes of all fine pores, is 0.2 or more, and having a particle size of 75 μm or more including a particle size distribution consisting of a first particle size range of 0.50 mm to 0.85 mm; and a second particle size range of 0.85 to 1.7 mm, wherein the first particle size range is at a greater particle size distribution percentage as compared to the second particle size range, and wherein the porous carbon material is made from a plant based material including siliconwherein the porous carbon material is made from a plant-derived material including one or more of a husk of a rice, a husk of a barley, a husk of a wheat, a husk of a rye, a husk of a Japanese millet, a husk of a foxtail millet, a straw of a rice, a straw of a barley, a straw of a wheat, a straw of a rye, a straw of a Japanese millet, a straw of a foxtail millet, a coffee bean, a tea leave, a green tea leave, a black tea leave, a sugar cane, a bagasse, a corn, a corn core, a fruit skin, a citrus fruit skin, a skin of a mandarin orange, a skin of a banana, a reed, a Wakame, a fern, a bryophytes, an algae, and a seeweed.

4. A decontaminant comprising:
a porous carbon material having a value of a specific surface area based on a nitrogen BET method of $1\times10^2$ m$^2$/g or more, a volume of fine pores by mercury porosimetry of 1.0 cm$^3$/g or more, and a particle size distribution consisting of a first particle size range of 0.50 mm to 0.85 mm; and a second particle size range of 0.85 to 1.7 mm, wherein the first particle size range is at a greater particle size distribution percentage as compared to the second particle size range, and wherein the porous carbon material is made from a plant-derived material including one or more of a husk of a rice, a husk of a barley, a husk of a wheat, a husk of a rye, a husk of a Japanese millet, a husk of a foxtail millet, a straw of a rice, a straw of a barley, a straw of a wheat, a straw of a rye, a straw of a Japanese millet, a straw of a foxtail millet, a coffee bean, a tea leave, a green tea leave, a black tea leave, a sugar cane, a bagasse, a corn, a corn core, a fruit skin, a citrus fruit skin, a skin of a mandarin orange, a skin of a banana, a reed, a Wakame, a fern, a bryophytes, an algae, and a seeweed.

5. The decontaminant according to claim 1, wherein a bulk density of the porous carbon material is 0.1 g/cm$^3$ or more and 0.8 g/cm$^3$ or less.

6. A carbon/polymer composite for removing a contaminant, comprising:
a porous carbon material having a value of a specific surface area based on a nitrogen BET method of $1 \times 10^2$ m$^2$/g or more, a volume of fine pores based on a BJH method of 0.3 cm$^3$/g or more, and a particle size distribution consisting of a first particle size range of 0.50 mm to 0.85 mm; and a second particle size range of 0.85 to 1.7 mm, wherein the first particle size range is at a greater particle size distribution percentage as compared to the second particle size range, and wherein the porous carbon material is made from a plant-derived material including one or more of a husk of a rice, a husk of a barley, a husk of a wheat, a husk of a rye, a husk of a Japanese millet, a husk of a foxtail millet, a straw of a rice, a straw of a barley, a straw of a wheat, a straw of a rye, a straw of a Japanese millet, a straw of a foxtail millet, a coffee bean, a tea leave, a green tea leave, a black tea leave, a sugar cane, a bagasse, a corn, a corn core, a fruit skin, a citrus fruit skin, a skin of a mandarin orange, a skin of a banana, a reed, a Wakame, a fern, a bryophytes, an algae, and a seeweed; and
a binder.

7. A carbon/polymer composite for removing a contaminant, comprising:
a porous carbon material having a value of a specific surface area based on a nitrogen BET method of $1 \times 10^2$ m$^2$/g or more, a total of volumes of fine pores having a diameter of from $1 \times 10^{-9}$ m to $5 \times 10^{-7}$ m, obtained by a non-localized density functional theory method, of 1.0 cm$^3$/g or more, and a particle size distribution consisting of a first particle size range of 0.50 mm to 0.85 mm; and a second particle size range of 0.85 to 1.7 mm, wherein the first particle size range is at a greater particle size distribution percentage as compared to the second particle size range, and wherein the porous carbon material is made from a plant-derived material including one or more of a husk of a rice, a husk of a barley, a husk of a wheat, a husk of a rye, a husk of a Japanese millet, a husk of a foxtail millet, a straw of a rice, a straw of a barley, a straw of a wheat, a straw of a rye, a straw of a Japanese millet, a straw of a foxtail millet, a coffee bean, a tea leave, a green tea leave, a black tea leave, a sugar cane, a bagasse, a corn, a corn core, a fruit skin, a citrus fruit skin, a skin of a mandarin orange, a skin of a banana, a reed, a Wakame, a fern, a bryophytes, an algae, and a seeweed; and
a binder.

8. A carbon/polymer composite for removing a contaminant comprising:
a porous carbon material having a value of a specific surface area based on a nitrogen BET method of $1 \times 10^2$ m$^2$/g or more, having at least one peak in the range of 3 nm to 20 nm, in a pore diameter distribution obtained by a non-localized density functional theory method, in which a ratio of a total of volumes of fine pores that have pore diameters in the range of 3 nm to 20 nm, with respect to a sum total of volumes of all fine pores, is 0.2 or more, and having a particle size distribution consisting of a first particle size range of 0.50 mm to 0.85 mm; and a second particle size range of 0.85 to 1.7 mm, wherein the first particle size range is at a greater particle size distribution percentage as compared to the second particle size range; and wherein the porous carbon material is made from a plant-derived material including one or more of a husk of a rice, a husk of a barley, a husk of a wheat, a husk of a rye, a husk of a Japanese millet, a husk of a foxtail millet, a straw of a rice, a straw of a barley, a straw of a wheat, a straw of a rye, a straw of a Japanese millet, a straw of a foxtail millet, a coffee bean, a tea leave, a green tea leave, a black tea leave, a sugar cane, a bagasse, a corn, a corn core, a fruit skin, a citrus fruit skin, a skin of a mandarin orange, a skin of a banana, a reed, a Wakame, a fern, a bryophytes, an algae, and a seeweed; and
a binder.

9. A carbon/polymer composite for removing a contaminant comprising:
a porous carbon material having a value of a specific surface area based on a nitrogen BET method of $1 \times 10^2$ m$^2$/g or more, a volume of fine pores by mercury porosimetry of 1.0 cm$^3$/g or more, and a particle size distribution consisting of a first particle size range of 0.50 mm to 0.85 mm; and a second particle size range of 0.85 to 1.7 mm, wherein the first particle size range is at a greater particle size distribution percentage as compared to the second particle size range; and wherein the porous carbon material is made from a plant-derived material including one or more of a husk of a rice, a husk of a barley, a husk of a wheat, a husk of a rye, a husk of a Japanese millet, a husk of a foxtail millet, a straw of a rice, a straw of a barley, a straw of a wheat, a straw of a rye, a straw of a Japanese millet, a straw of a foxtail millet, a coffee bean, a tea leave, a green tea leave, a black tea leave, a sugar cane, a bagasse, a corn, a corn core, a fruit skin, a citrus fruit skin, a skin of a mandarin orange, a skin of a banana, a reed, a Wakame, a fern, a bryophytes, an algae, and a seeweed; and
a binder.

10. A decontamination sheet member comprising:
a porous carbon material having a value of a specific surface area based on a nitrogen BET method of $1 \times 10^2$ m$^2$/g or more, a volume of fine pores based on a BJH method of 0.3 cm$^3$/g or more, and a particle size distribution consisting of a first particle size range of 0.50 mm to 0.85 mm; and a second particle size range of 0.85 to 1.7 mm, wherein the first particle size range is at a greater particle size distribution percentage as compared to the second particle size range; and wherein the porous carbon material is made from a plant-derived material including one or more of a husk of a rice, a husk of a barley, a husk of a wheat, a husk of a rye, a husk of a Japanese millet, a husk of a foxtail millet, a straw of a rice, a straw of a barley, a straw of a wheat, a straw of a rye, a straw of a Japanese millet, a straw of a foxtail millet, a coffee bean, a tea leave, a green tea leave, a black tea leave, a sugar cane, a bagasse, a corn, a corn core, a fruit skin, a citrus fruit skin, a skin of a mandarin orange, a skin of a banana, a reed, a Wakame, a fern, a bryophytes, an algae, and a seeweed; and a support member.

11. A decontamination sheet member comprising:

a porous carbon material having a value of a specific surface area based on a nitrogen BET method of $1\times10^2$ m$^2$/g or more, a total of volumes of fine pores having a diameter of from $1\times10^{-9}$ m to $5\times10^{-7}$ m, obtained by a non-localized density functional theory method, of 1.0 cm$^3$/g or more, and a particle size distribution consisting of a first particle size range of 0.50 mm to 0.85 mm; and a second particle size range of 0.85 to 1.7 mm, wherein the first particle size range is at a greater particle size distribution percentage as compared to the second particle size range, and wherein the porous carbon material is made from a plant-derived material including one or more of a husk of a rice, a husk of a barley, a husk of a wheat, a husk of a rye, a husk of a Japanese millet, a husk of a foxtail millet, a straw of a rice, a straw of a barley, a straw of a wheat, a straw of a rye, a straw of a Japanese millet, a straw of a foxtail millet, a coffee bean, a tea leave, a green tea leave, a black tea leave, a sugar cane, a bagasse, a corn, a corn core, a fruit skin, a citrus fruit skin, a skin of a mandarin orange, a skin of a banana, a reed, a Wakame, a fern, a bryophytes, an algae, and a seeweed; and a support member.

12. A decontamination sheet member comprising:

a porous carbon material having a value of a specific surface area based on a nitrogen BET method of $1\times10^2$ m$^2$/g or more, having at least one peak in the range of 3 nm to 20 nm, in a pore diameter distribution obtained by a non-localized density functional theory method, un which a ratio of a total of volumes of fine pores that have pore diameters in the range of 3 nm to 20 nm, with respect to a sum total of volumes of all fine pores, is 0.2 or more, and having a particle size distribution consisting of a first particle size range of 0.50 mm to 0.85 mm; and a second particle size range of 0.85 to 1.7 mm, wherein the first particle size range is at a greater particle size distribution percentage as compared to the second particle size range, and wherein the porous carbon material is made from a plant-derived material including one or more of a husk of a rice, a husk of a barley, a husk of a wheat, a husk of a rye, a husk of a Japanese millet, a husk of a foxtail millet, a straw of a rice, a straw of a barley, a straw of a wheat, a straw of a rye, a straw of a Japanese millet, a straw of a foxtail millet, a coffee bean, a tea leave, a green tea leave, a black tea leave, a sugar cane, a bagasse, a corn, a corn core, a fruit skin, a citrus fruit skin, a skin of a mandarin orange, a skin of a banana, a reed, a Wakame, a fern, a bryophytes, an algae, and a seeweed; and a support member.

13. A decontamination sheet member comprising:

a porous carbon material having a value of a specific surface area based on a nitrogen BET method of $1\times10^2$ m$^2$/g or more, a volume of fine pores by mercury porosimetry of 1.0 cm$^3$/g or more, and a particle size distribution consisting of a first particle size range of 0.50 mm to 0.85 mm; and a second particle size range of 0.85 to 1.7 mm, wherein the first particle size range is at a greater particle size distribution percentage as compared to the second particle size range, and wherein the porous carbon material is made from a plant-derived material including one or more of a husk of a rice, a husk of a barley, a husk of a wheat, a husk of a rye, a husk of a Japanese millet, a husk of a foxtail millet, a straw of a rice, a straw of a barley, a straw of a wheat, a straw of a rye, a straw of a Japanese millet, a straw of a foxtail millet, a coffee bean, a tea leave, a green tea leave, a black tea leave, a sugar cane, a bagasse, a corn, a corn core, a fruit skin, a citrus fruit skin, a skin of a mandarin orange, a skin of a banana, a reed, a Wakame, a fern, a bryophytes, an algae, and a seeweed; and a support member.

14. A filter medium comprising:

a porous carbon material having a value of a specific surface area based on a nitrogen BET method of $1\times10^2$ m$^2$/g or more, a volume of fine pores based on a BJH method of 0.3 cm$^3$/g or more, and a particle size distribution consisting of a first particle size range of 0.50 mm to 0.85 mm; and a second particle size range of 0.85 to 1.7 mm, wherein the first particle size range is at a greater particle size distribution percentage as compared to the second particle size range, and wherein the porous carbon material is made from a plant-derived material including one or more of a husk of a rice, a husk of a barley, a husk of a wheat, a husk of a rye, a husk of a Japanese millet, a husk of a foxtail millet, a straw of a rice, a straw of a barley, a straw of a wheat, a straw of a rye, a straw of a Japanese millet, a straw of a foxtail millet, a coffee bean, a tea leave, a green tea leave, a black tea leave, a sugar cane, a bagasse, a corn, a corn core, a fruit skin, a citrus fruit skin, a skin of a mandarin orange, a skin of a banana, a reed, a Wakame, a fern, a bryophytes, an algae, and a seeweed.

15. The filter medium according to claim 14, wherein a bulk density of a porous carbon material is 0.1 g/cm$^3$ or more and 0.8 g/cm$^3$ or less.

16. A filter medium comprising:

a porous carbon material having a value of a specific surface area based on a nitrogen BET method of $1\times10^2$ m$^2$/g or more, a total of volumes of fine pores having a diameter of from $1\times10^{-9}$ m to $5\times10^{-7}$ m, obtained by a non-localized density functional theory method, of 1.0 cm$^3$/g or more, and a particle size distribution consisting of a first particle size range of 0.50 mm to 0.85 mm; and a second particle size range of 0.85 to 1.7 mm, wherein the first particle size range is at a greater particle size distribution percentage as compared to the second particle size range, and wherein the porous carbon material is made from a plant-derived material including one or more of a husk of a rice, a husk of a barley, a husk of a wheat, a husk of a rye, a husk of a Japanese millet, a husk of a foxtail millet, a straw of a rice, a straw of a barley, a straw of a wheat, a straw of a rye, a straw of a Japanese millet, a straw of a foxtail millet, a coffee bean, a tea leave, a green tea leave, a black tea leave, a sugar cane, a bagasse, a corn, a corn core, a fruit skin, a citrus fruit skin, a skin of a mandarin orange, a skin of a banana, a reed, a Wakame, a fern, a bryophytes, an algae, and a seeweed.

17. A filter medium comprising:

a porous carbon material having a value of a specific surface area based on a nitrogen BET method of $1\times10^2$ m$^2$/g or more, having at least one peak in the range of 3 nm to 20 nm, in a pore diameter distribution obtained by a non-localized density functional theory method, in which a ratio of a total of volumes of fine pores that have pore diameters in the range of 3 nm to 20 nm, with respect to a sum total of volumes of all fine pores, is 0.2 or more, and having a particle size distribution consisting of a first particle size range of 0.50 mm to 0.85 mm; and a second particle size range of 0.85 to 1.7 mm, wherein the first particle size range is at a greater particle size distribution percentage as compared to the second particle size range, and wherein the porous carbon material is made from a plant-derived material including one or more of a husk of a rice, a husk of a barley, a husk of a wheat, a husk of a rye, a husk of a Japanese millet, a husk of a foxtail millet, a straw of a rice, a straw of a barley, a straw of a wheat, a straw of a rye, a straw of a Japanese millet, a straw of a foxtail millet, a coffee bean, a tea leave, a green tea leave, a black tea leave, a sugar cane, a bagasse, a corn, a corn core, a fruit skin, a citrus fruit skin, a skin of a mandarin orange, a skin of a banana, a reed, a Wakame, a fern, a bryophytes, an algae, and a seeweed.

18. A filter medium comprising:
a porous carbon material having a value of a specific surface area based on a nitrogen BET method of $1 \times 10^2$ m$^2$/g or more, a volume of fine pores by mercury porosimetry of 1.0 cm$^3$/g or more, and a particle size distribution consisting of a first particle size range of 0.50 mm to 0.85 mm; and a second particle size range of 0.85 to 1.7 mm, wherein the first particle size range is at a greater particle size distribution percentage as compared to the second particle size range, and wherein the porous carbon material is made from a plant-derived material including one or more of a husk of a rice, a husk of a barley, a husk of a wheat, a husk of a rye, a husk of a Japanese millet, a husk of a foxtail millet, a straw of a rice, a straw of a barley, a straw of a wheat, a straw of a rye, a straw of a Japanese millet, a straw of a foxtail millet, a coffee bean, a tea leave, a green tea leave, a black tea leave, a sugar cane, a bagasse, a corn, a corn core, a fruit skin, a citrus fruit skin, a skin of a mandarin orange, a skin of a banana, a reed, a Wakame, a fern, a bryophytes, an algae, and a seeweed.

19. A filter medium comprising:
a porous carbon material having a value of a specific surface area based on a nitrogen BET method of $1 \times 10^2$ m$^2$/g or more, a volume of fine pores based on a BJH method of 0.1 cm$^3$/g or more, and having a plant containing at least one component selected from the group consisting of sodium, magnesium, potassium and calcium as a raw material including a particle size distribution; consisting of a first particle size range of 0.50 mm to 0.85 mm; and a second particle size range of 0.85 to 1.7 mm, wherein the first particle size range is at a greater particle size distribution percentage as compared to the second particle size range, and wherein the porous carbon material is made from a plant-derived material including one or more of a husk of a rice, a husk of a barley, a husk of a wheat, a husk of a rye, a husk of a Japanese millet, a husk of a foxtail millet, a straw of a rice, a straw of a barley, a straw of a wheat, a straw of a rye, a straw of a Japanese millet, a straw of a foxtail millet, a coffee bean, a tea leave, a green tea leave, a black tea leave, a sugar cane, a bagasse, a corn, a corn core, a fruit skin, a citrus fruit skin, a skin of a mandarin orange, a skin of a banana, a reed, a Wakame, a fern, a bryophytes, an algae, and a seeweed.

20. A filter medium comprising:
a porous carbon material having a value of a specific surface area based on a nitrogen BET method of $1 \times 10^2$ m$^2$/g or more, a total of volumes of fine pores having a diameter of from $1 \times 10^{-9}$ m to $5 \times 10^{-7}$ m, obtained by a non-localized density functional theory method, of 1.0 cm$^3$/g or more, and having a plant containing at least one component selected from the group consisting of sodium, magnesium, potassium and calcium as a raw material including a particle size distribution consisting of a first particle size range of 0.50 mm to 0.85 mm; and a second particle size range of 0.85 to 1.7 mm, wherein the first particle size range is at a greater particle size distribution percentage as compared to the second particle size range, and wherein the porous carbon material is made from a plant-derived material including one or more of a husk of a rice, a husk of a barley, a husk of a wheat, a husk of a rye, a husk of a Japanese millet, a husk of a foxtail millet, a straw of a rice, a straw of a barley, a straw of a wheat, a straw of a rye, a straw of a Japanese millet, a straw of a foxtail millet, a coffee bean, a tea leave, a green tea leave, a black tea leave, a sugar cane, a bagasse, a corn, a corn core, a fruit skin, a citrus fruit skin, a skin of a mandarin orange, a skin of a banana, a reed, a Wakame, a fern, a bryophytes, an algae, and a seeweed.

21. A filter medium comprising:
a porous carbon material having a value of a specific surface area based on a nitrogen BET method of $1 \times 10^2$ m$^2$/g or more, having at least one peak in the range of 3 nm to 20 nm, in a pore diameter distribution obtained by a non-localized density functional theory method, in which a ratio of a total of volumes of fine pores that have pore diameters in the range of 3 nm to 20 nm, with respect to a sum total of volumes of all fine pores, is 0.2 or more, and having a plant containing at least one component selected from the group consisting of sodium, magnesium, potassium and calcium as a raw material including a particle size distribution consisting of a first particle size range of 0.50 mm to 0.85 mm; and a second particle size range of 0.85 to 1.7 mm, wherein the first particle size range is at a greater particle size distribution percentage as compared to the second particle size range, and wherein the porous carbon material is made from a plant-derived material including one or more of a husk of a rice, a husk of a barley, a husk of a wheat, a husk of a rye, a husk of a Japanese millet, a husk of a foxtail millet, a straw of a rice, a straw of a barley, a straw of a wheat, a straw of a rye, a straw of a Japanese millet, a straw of a foxtail millet, a coffee bean, a tea leave, a green tea leave, a black tea leave, a sugar cane, a bagasse, a corn, a corn core, a fruit skin, a citrus fruit skin, a skin of a mandarin orange, a skin of a banana, a reed, a Wakame, a fern, a bryophytes, an algae, and a seeweed.

22. A filter medium comprising:
a porous carbon material having a value of a specific surface area based on a nitrogen BET method of $1 \times 10^2$ m$^2$/g or more, a volume of fine pores by mercury porosimetry of 1.0 cm$^3$/g or more, and having a plant containing at least one component selected from the group consisting of sodium, magnesium, potassium and calcium as a raw material including a particle size distribution consisting of a first particle size range of 0.50 mm to 0.85 mm; and a second particle size range of 0.85 to 1.7 mm, wherein the first particle size range is at a greater particle size distribution percentage as compared to the second particle size range, and wherein the porous carbon material is made from a plant-derived material including one or more of a husk of a rice, a husk of a barley, a husk of a wheat, a husk of a rye, a husk of a Japanese millet, a husk of a foxtail millet, a straw of a rice, a straw of a barley, a straw of a wheat, a straw of a rye, a straw of a Japanese millet, a straw of a foxtail millet, a coffee bean, a tea leave, a green tea leave, a black tea leave, a sugar cane, a bagasse, a corn, a corn core, a fruit skin, a citrus fruit skin, a skin of a mandarin orange, a skin of a banana, a reed, a Wakame, a fern, a bryophytes, an algae, and a seeweed.

23. The filter medium according to claim 19, wherein at 6 hours after 1 g of a filter medium is added to 50 mL of water having hardness of 0.1 or less, the hardness becomes 5 or more.

24. A filter medium comprising:
the porous carbon material according to claim 14,
wherein, when water containing 1 μg/L of a substance having a molecular weight of $1 \times 10^2$ to $1 \times 10^5$ is continuously flowed at a spatial velocity of 1200 $hr^{-1}$ for 48 hours, the time taken until a removal rate of the substance reaches 80% is twice or more longer than the time taken until the removal rate of the substance reaches 80% when a coconut shell activated carbon is used.

25. A filter material comprising:
the porous carbon material according to claim 14,
wherein when water containing 0.9 mg/L of dodecylbenzene sulfonate is continuously flowed at a spatial velocity of 1200 $hr^{-1}$ for 25 hours, a removal rate of the dodecylbenzene sulfonate is 10% or more.

26. A filter material comprising:
the porous carbon material according to claim 14,
wherein when water containing 6 μg/L of chlorothalonil is continuously flowed at a spatial velocity of 1200 $hr^{-1}$ for 50 hours, a removal rate of the chlorothalonil is 60% or more.

27. A filter material comprising:
the porous carbon material according to claim 14,
wherein when water containing 6 μg/L of dichlorvos is continuously flowed at a spatial velocity of 1200 $hr^{-1}$ for 25 hours, a removal rate of the dichlorvos is 60% or more.

28. A filter material comprising:
the porous carbon material according to claim 14,
wherein when water containing 6 μg/L of soluble lead is continuously flowed at a spatial velocity of 1200 $hr^{-1}$ for 25 hours, a removal rate of the soluble lead is 30% or more.

29. A filter material comprising:
the porous carbon material according to claim 14,
wherein when water containing 0.2 mg/L of free chlorine is continuously flowed at a spatial velocity of 1200 $hr^{-1}$ for 50 hours, a removal rate of the free chlorine is 70% or more.

30. A filter material comprising:
the porous carbon material according to claim 14,
wherein when water containing 130 μg/L of total organic halogens in terms of chlorine is continuously flowed at a spatial velocity of 1200 $hr^{-1}$ for 5 hours, a removal rate of the total organic halogens is 45% or more.

* * * * *